United States Patent
Wu et al.

(10) Patent No.: US 10,972,240 B2
(45) Date of Patent: Apr. 6, 2021

(54) PILOT SEQUENCE TRANSMISSION METHOD AND APPARATUS

(71) Applicant: Huawei Technologies Co., Ltd., Shenzhen (CN)

(72) Inventors: Yiqun Wu, Shanghai (CN); Yan Chen, Shanghai (CN); Xiuqiang Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/539,698

(22) Filed: Aug. 13, 2019

(65) Prior Publication Data
US 2019/0372733 A1 Dec. 5, 2019

Related U.S. Application Data

(63) Continuation of application No. 15/847,470, filed on Dec. 19, 2017, now Pat. No. 10,419,182, which is a (Continued)

(51) Int. Cl.
*H04L 5/00* (2006.01)
*H04L 27/26* (2006.01)
*H04W 4/00* (2018.01)

(52) U.S. Cl.
CPC .......... *H04L 5/0048* (2013.01); *H04L 5/0032* (2013.01); *H04L 5/0051* (2013.01); (Continued)

(58) Field of Classification Search
CPC ... H04L 5/0048; H04L 5/0032; H04L 5/0051; H04L 27/26; H04L 27/2601; H04L 27/2613
(Continued)

(56) References Cited

U.S. PATENT DOCUMENTS

2005/0084000 A1 4/2005 Krauss et al.
2009/0122886 A1* 5/2009 Oketani ................ H04L 27/262
375/260
(Continued)

FOREIGN PATENT DOCUMENTS

CN 1719817 A * 1/2006
CN 1719817 A 1/2006
(Continued)

OTHER PUBLICATIONS

Bayesteh et al.,"Blind Detection of SCMA for Uplink Grant-Free Multiple-Access," 2014 11th International Symposium on Wireless Communications Systems, pp. 1-5 (Aug. 26, 2014).
(Continued)

*Primary Examiner* — Abdelnabi O Musa
(74) *Attorney, Agent, or Firm* — Leydig, Voit & Mayer, Ltd.

(57) ABSTRACT

The present disclosure provides a pilot sequence transmission method and apparatus. A terminal device determines a first pilot number, determines a first pilot sequence and a second pilot sequence according to the first pilot number, respectively maps the first pilot sequence and the second pilot sequence to a first orthogonal frequency division multiplexing (OFDM) symbol and a second OFDM symbol of a grant free transmission resource, and sends the first pilot sequence and the second pilot sequence by using the first OFDM symbol and the second OFDM symbol. Therefore, a network device can determine activeness of the terminal device by detecting the first pilot sequence, and can detect only the second pilot sequence corresponding to the first pilot sequence, and does not need to detect all possible second pilot sequences, so that a quantity of detected pilots can be significantly reduced, and pilot detection complexity is reduced.

19 Claims, 10 Drawing Sheets

Related U.S. Application Data continuation of application No. PCT/CN2015/082851, filed on Jun. 30, 2015.

(52) U.S. Cl.
CPC .......... *H04L 27/26* (2013.01); *H04L 27/2601* (2013.01); *H04L 27/2613* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 2014/0254544 | A1* | 9/2014 | Kar Kin Au | H04L 1/1812 370/330 |
| 2016/0373226 | A1* | 12/2016 | Wang | H04L 27/2613 |
| 2017/0063569 | A1 | 3/2017 | Currivan et al. | |
| 2017/0195159 | A1* | 7/2017 | Lee | H04L 25/0224 |
| 2018/0045821 | A1* | 2/2018 | Lee | H04W 72/1278 |
| 2018/0123758 | A1* | 5/2018 | Lee | H04L 5/0048 |

FOREIGN PATENT DOCUMENTS

| | | | |
|---|---|---|---|
| CN | 1868152 | A | 11/2006 |
| CN | 101026432 | A | 8/2007 |
| CN | 102036312 | B * | 8/2013 |
| CN | 102036312 | B | 8/2013 |
| CN | 104079519 | A | 10/2014 |
| KR | 100653282 | B1 * | 11/2006 |
| KR | 100653282 | B1 | 11/2006 |
| WO | 2012092066 | A1 | 7/2012 |
| WO | 2014135126 | A1 | 9/2014 |

OTHER PUBLICATIONS

Tan et al.,"Compressive Sensing Based Time-Frequency Joint Non-Orthogonal Multiple Access," 2016 IEEE International Symposium on Broadband Multimedia Systems and Broadcasting, pp. 1-4 (Jun. 1, 2016).

"pCR 45.820 NB M2M—Grant-Free Multiple Access for Uplink Transmission," 3GPP TSG GERAN CIoT Ad-hoc#3, Kista, Sweden, GPC150322, total 13 pages, 3rd Generation Partnership Project, Valbonne, France (Jun. 29-Jul. 2, 2015).

"Discussions of Grant-Free Multiple Access in CIoT (Update of GP-150378)," 3GPP TSG GERAN1 Adhoc #3, Kista, Sweden, GPC150321, total 8 pages, 3rd Generation Partnership Project, Valbonne, France (Jun. 29-Jul. 2, 2015).

\* cited by examiner

PILOT SEQUENCE TRANSMISSION METHOD AND APPARATUS

CROSS-REFERENCE TO RELATED APPLICATIONS

This application is a continuation of U.S. patent application Ser. No. 15/847,470, filed on Dec. 19, 2017, which is a continuation of International Application No. PCT/CN2015/082851, filed on Jun. 30, 2015. All of the afore-mentioned patent applications are hereby incorporated by reference in their entireties.

TECHNICAL FIELD

The present disclosure relates to the communications field, and in particular, to a pilot sequence transmission method and apparatus in the communications field.

BACKGROUND

A current communications system mainly supports voice communication and data communication. Usually, a quantity of connections supported by a conventional base station is limited, and is easy to be implemented. However, a next-generation mobile communications system not only needs to support conventional voice communication and data communication, but also supports machine to machine (M2M) communication that is also referred to as machine type communication (MTC). According to prediction, by 2020, a quantity of MTC devices connected to networks may reach 50 to 100 billion, and this may far exceed a current quantity of connections.

For an MTC type service, because service types of the MTC type service differ from each other, network requirements differ greatly. Generally, there may be two services having the following requirements: One is a service that requires reliable transmission but is not sensitive to a delay, and the other is a service that requires a low delay and high-reliability transmission. It is relatively easy to process the service that requires reliable transmission but is not sensitive to a delay. However, for the service that requires a low delay and high-reliability transmission, if transmission is unreliable, retransmission is caused and an excessively large transmission delay is caused, and consequently, the requirements cannot be satisfied.

To handle a large quantity of MTC type services in a future network and satisfy low-delay and high-reliability service transmission, an uplink grant free transmission solution is proposed. In a grant free transmission system, there are a large quantity of terminal devices, but there are also an extremely small quantity of terminal devices that access a network, and the terminal device may randomly select a grant free transmission resource to send data. Currently, a network device needs to detect each pilot, to determine an active terminal device.

Currently, in a Long Term Evolution (LTE) system, an uplink pilot sequence includes a demodulation reference signal (DMRS) and a sounding reference signal (SRS). The DMRS is used for channel estimation, so that uplink data is demodulated according to a channel estimation result, and the SRS is used for uplink channel quality measurement and occupies an entire frequency band.

If the DMRS in the LTE system is used in an uplink grant free transmission system, the network device needs to detect every possible DMRS. A common DMRS detection method is: converting a received frequency domain signal to a time domain, to perform windowing and noise reduction processing. In this conversion process, inverse fast Fourier transform (IFFT) and fast Fourier transform (FFT) operations are required, and complexity is extremely high.

Therefore, to reduce pilot detection complexity becomes a technical problem urgently to be resolved in the grant free transmission system.

SUMMARY

In view of this, embodiments of the present disclosure provide a pilot sequence transmission method and apparatus, to resolve a problem of high pilot detection complexity.

According to a first aspect, a pilot sequence transmission method is provided, where the method includes: determining a first pilot sequence used to indicate whether a terminal device is in an active state; determining a second pilot sequence used for uplink data demodulation; mapping the first pilot sequence to a first orthogonal frequency division multiplexing OFDM symbol of a grant free transmission resource; mapping the second pilot sequence to a second OFDM symbol of the grant free transmission resource; and sending the first pilot sequence and the second pilot sequence by using the first OFDM symbol and the second OFDM symbol.

With reference to the first aspect, in a first possible implementation of the first aspect, the method further includes: determining a first pilot number; the determining a first pilot sequence used to indicate whether a terminal device is in an active state includes: determining the first pilot sequence according to the first pilot number; and the determining a second pilot sequence used for uplink data demodulation includes: determining the second pilot sequence according to the first pilot number.

With reference to the first possible implementation of the first aspect, in a second possible implementation of the first aspect, the determining a first pilot number includes: determining the first pilot number according to an identifier of the terminal device; or determining the first pilot number according to an identifier of the grant free transmission resource and an identifier of the terminal device; or generating the first pilot number by using a random number generator.

With reference to the first aspect, or the first or the second possible implementation of the first aspect, in a third possible implementation of the first aspect, the mapping the first pilot sequence to a first orthogonal frequency division multiplexing OFDM symbol of a grant free transmission resource includes: mapping the first pilot sequence to a part of a subband of the first OFDM symbol of the grant free transmission resource.

With reference to the third possible implementation of the first aspect, in a fourth possible implementation of the first aspect, an element of the first pilot sequence is a non-zero element.

With reference to the third possible implementation of the first aspect, in a fifth possible implementation of the first aspect, the first pilot sequence includes a first pilot sub-sequence and a second pilot sub-sequence, each element of the first pilot sub-sequence is a zero element, and an element of the second pilot sub-sequence is a non-zero element.

With reference to any one of the third to the fifth possible implementations of the first aspect, in a sixth possible implementation of the first aspect, the mapping the first pilot sequence to a first orthogonal frequency division multiplexing OFDM symbol of a grant free transmission resource includes: mapping the non-zero element included in the first pilot sequence to a first subband of the first OFDM symbol of the grant free transmission resource, where the first subband includes M resource elements REs, a non-zero symbol formed after the non-zero element is mapped is an M-order Walsh code, and M is a positive integer and is an exponential power of 2.

With reference to the sixth possible implementation of the first aspect, in a seventh possible implementation of the first aspect, the REs included in the first subband are M consecutive REs.

With reference to any one of the first aspect or the first to the seventh possible implementations of the first aspect, in an eighth possible implementation of the first aspect, the mapping the first pilot sequence to a first orthogonal frequency division multiplexing OFDM symbol of a grant free transmission resource includes: repeatedly mapping the first pilot sequence to different first OFDM symbols of the grant free transmission resource or different subbands of the first OFDM symbol of the grant free transmission resource.

With reference to any one of the first aspect or the first to the eighth possible implementations of the first aspect, in a ninth possible implementation of the first aspect, the first pilot sequence is in one-to-one correspondence with the second pilot sequence.

With reference to the ninth possible implementation of the first aspect, in a tenth possible implementation of the first aspect, the second pilot sequence is a sub-sequence combination including multiple sub-sequences.

With reference to the tenth possible implementation of the first aspect, in an eleventh possible implementation of the first aspect, the mapping the second pilot sequence to a second OFDM symbol of the grant free transmission resource includes: mapping at least two of the multiple sub-sequences included in the second pilot sequence to a same second OFDM symbol of the grant free transmission resource.

With reference to the eleventh possible implementation of the first aspect, in a twelfth possible implementation of the first aspect, the mapping the second pilot sequence to a second OFDM symbol of the grant free transmission resource includes: mapping all the multiple sub-sequences included in the second pilot sequence to a same second OFDM symbol of the grant free transmission resource.

With reference to the eleventh possible implementation of the first aspect, in a thirteenth possible implementation of the first aspect, the mapping the second pilot sequence to a second OFDM symbol of the grant free transmission resource includes: separately mapping at least two of the multiple sub-sequences included in the second pilot sequence to different subbands of a same second OFDM symbol of the grant free transmission resource.

With reference to the tenth possible implementation of the first aspect, in a fourteenth possible implementation of the first aspect, the mapping the second pilot sequence to a second OFDM symbol of the grant free transmission resource includes: separately mapping all the multiple sub-sequences included in the second pilot sequence to different second OFDM symbols of the grant free transmission resource.

With reference to the fourteenth possible implementation of the first aspect, in a fifteenth possible implementation of the first aspect, the mapping the second pilot sequence to a second OFDM symbol of the grant free transmission resource includes: separately mapping all the multiple sub-sequences included in the second pilot sequence to entire frequency bands of the different second OFDM symbols of the grant free transmission resource, where the second OFDM symbols are different from the first OFDM symbol.

With reference to any one of the tenth to the fifteenth possible implementations of the first aspect, in a sixteenth possible implementation of the first aspect, the second pilot sequence is generated by using multiple cyclic shift values, and the multiple cyclic shift values are in one-to-one correspondence with the multiple sub-sequences.

With reference to any one of the first aspect or the first to the sixteenth possible implementations of the first aspect, in a seventeenth possible implementation of the first aspect, the mapping the second pilot sequence to a second OFDM symbol of the grant free transmission resource includes: repeatedly mapping the second pilot sequence to different second OFDM symbols of the grant free transmission resource.

With reference to any one of the first aspect or the first to the seventeenth possible implementations of the first aspect, in an eighteenth possible implementation of the first aspect, the determining a first pilot sequence used to indicate whether a terminal device is in an active state includes: selecting the first pilot sequence from a first pilot sequence set.

With reference to any one of the first aspect or the first to the eighteenth possible implementations of the first aspect, in a nineteenth possible implementation of the first aspect, the determining a second pilot sequence used for uplink data demodulation includes:
selecting the second pilot sequence from a second pilot sequence set.

With reference to any one of the first aspect or the first to the nineteenth possible implementations of the first aspect, in a twentieth possible implementation of the first aspect, the grant free transmission resource is a transmission resource combining time and frequency, or a transmission resource combining time, frequency, and code domains.

With reference to any one of the first aspect or the first to the twentieth possible implementations of the first aspect, in a twenty-first possible implementation of the first aspect, the method is applied to device-to-device D2D communication, machine to machine M2M communication, or machine type communication.

According to a second aspect, a pilot sequence transmission method is provided, where the method includes: detecting, on a first orthogonal frequency division multiplexing OFDM symbol of a grant free transmission resource, a first pilot sequence sent by a terminal device, where the first pilot sequence is used to indicate whether the terminal device is in an active state; detecting, on a second OFDM symbol of the grant free transmission resource, a second pilot sequence that is sent by the terminal device and that corresponds to the first pilot sequence, where the second pilot sequence is used for uplink data demodulation; and demodulating uplink data according to the second pilot sequence.

With reference to the second aspect, in a first possible implementation of the second aspect, the detecting, on a first orthogonal frequency division multiplexing OFDM symbol of a grant free transmission resource, a first pilot sequence sent by a terminal device includes: detecting the first pilot sequence in a part of a subband of the first OFDM symbol of the grant free transmission resource.

With reference to the first possible implementation of the second aspect, in a second possible implementation of the second aspect, an element of the first pilot sequence is a non-zero element.

With reference to the first possible implementation of the second aspect, in a third possible implementation of the second aspect, the first pilot sequence includes a first pilot sub-sequence and a second pilot sub-sequence, each element of the first pilot sub-sequence is a zero element, and an element of the second pilot sub-sequence is a non-zero element.

With reference to any one of the first to the third possible implementations of the second aspect, in a fourth possible implementation of the second aspect, the detecting, on a first orthogonal frequency division multiplexing OFDM symbol of a grant free transmission resource, a first pilot sequence sent by a terminal device includes: detecting the first pilot sequence in a first subband of the first OFDM symbol of the grant free transmission resource, where the first subband includes M resource elements REs, a non-zero symbol formed after the non-zero element is mapped is an M-order Walsh code, and M is a positive integer and is an exponential power of 2.

With reference to the fourth possible implementation of the second aspect, in a fifth possible implementation of the second aspect, the REs included in the first subband are M consecutive REs.

With reference to any one of the second aspect or the first to the fifth possible implementations of the second aspect, in a sixth possible implementation of the second aspect, the first pilot sequence is in one-to-one correspondence with the second pilot sequence.

With reference to the sixth possible implementation of the second aspect, in a seventh possible implementation of the second aspect, the second pilot sequence is a sub-sequence combination including multiple sub-sequences.

With reference to the seventh possible implementation of the second aspect, in an eighth possible implementation of the second aspect, at least two of the multiple sub-sequences included in the second pilot sequence are sub-sequences mapped to a same second OFDM symbol of the grant free transmission resource.

With reference to the eighth possible implementation of the second aspect, in a ninth possible implementation of the second aspect, all the multiple sub-sequences included in the second pilot sequence are sub-sequences mapped to a same second OFDM symbol of the grant free transmission resource.

With reference to the eighth possible implementation of the second aspect, in a tenth possible implementation of the second aspect, at least two of the multiple sub-sequences included in the second pilot sequence are sub-sequences separately mapped to different subbands of a same second OFDM symbol of the grant free transmission resource.

With reference to the seventh possible implementation of the second aspect, in an eleventh possible implementation of the second aspect, all the multiple sub-sequences included in the second pilot sequence are sub-sequences separately mapped to different second OFDM symbols of the grant free transmission resource.

With reference to the eleventh possible implementation of the second aspect, in a twelfth possible implementation of the second aspect, all the multiple sub-sequences included in the second pilot sequence are sub-sequences separately mapped to entire frequency bands of the different second OFDM symbols of the grant free transmission resource, and the second OFDM symbols are different from the first OFDM symbol.

With reference to any one of the seventh to the twelfth possible implementations of the second aspect, in a thirteenth possible implementation of the second aspect, the second pilot sequence is represented by multiple cyclic shift values, and the multiple cyclic shift values are in one-to-one correspondence with the multiple sub-sequences.

With reference to any one of the second aspect or the first to the thirteenth possible implementations of the second aspect, in a fourteenth possible implementation of the second aspect, the grant free transmission resource is a transmission resource combining time and frequency, or a transmission resource combining time, frequency, and code domains.

With reference to any one of the second aspect or the first to the fourteenth possible implementations of the second aspect, in a fifteenth possible implementation of the second aspect, the method is applied to device-to-device D2D communication, machine to machine M2M communication, or machine type communication.

According to a third aspect, a pilot sequence transmission apparatus is provided, where the apparatus includes: a first determining module, configured to determine a first pilot sequence used to indicate whether a terminal device is in an active state; a second determining module, configured to determine a second pilot sequence used for uplink data demodulation; a first mapping module, configured to map the first pilot sequence determined by the first determining module to a first orthogonal frequency division multiplexing OFDM symbol of a grant free transmission resource; a second mapping module, configured to map the second pilot sequence determined by the second determining module to a second OFDM symbol of the grant free transmission resource; and a sending module, configured to send the first pilot sequence and the second pilot sequence by using the first OFDM symbol mapped by the first mapping module and the second OFDM symbol mapped by the second mapping module.

With reference to the third aspect, in a first possible implementation of the third aspect, the apparatus further includes a third determining module, configured to determine a first pilot number; the first determining module is specifically configured to determine the first pilot sequence according to the first pilot number; and the second determining module is specifically configured to determine the second pilot sequence according to the first pilot number.

With reference to the first possible implementation of the third aspect, in a second possible implementation of the third aspect, the third determining module is specifically configured to: determine the first pilot number according to an identifier of the terminal device; or determine the first pilot number according to an identifier of the grant free transmission resource and an identifier of the terminal device; or generate the first pilot number by using a random number generator.

With reference to the third aspect, or the first or the second possible implementation of the third aspect, in a third possible implementation of the third aspect, the first mapping module is specifically configured to map the first pilot sequence to a part of a subband of the first OFDM symbol of the grant free transmission resource.

With reference to the third possible implementation of the third aspect, in a fourth possible implementation of the third aspect, an element of the first pilot sequence is a non-zero element.

With reference to the third possible implementation of the third aspect, in a fifth possible implementation of the third aspect, the first pilot sequence includes a first pilot sub-sequence and a second pilot sub-sequence, each element of the first pilot sub-sequence is a zero element, and an element of the second pilot sub-sequence is a non-zero element.

With reference to any one of the third to the fifth possible implementations of the third aspect, in a sixth possible implementation of the third aspect, the first mapping module is specifically configured to map the non-zero element included in the first pilot sequence to a first subband of the first OFDM symbol of the grant free transmission resource, where the first subband includes M resource elements REs, a non-zero symbol formed after the non-zero element is mapped is an M-order Walsh code, and M is a positive integer and is an exponential power of 2.

With reference to the sixth possible implementation of the third aspect, in a seventh possible implementation of the third aspect, the REs included in the first subband are M consecutive REs.

With reference to any one of the third aspect or the first to the seventh possible implementations of the third aspect, in an eighth possible implementation of the third aspect, the first mapping module is specifically configured to: repeatedly map the first pilot sequence to different first OFDM symbols of the grant free transmission resource; and/or repeatedly map the first pilot sequence to different subbands of the first OFDM symbol of the grant free transmission resource.

With reference to any one of the third aspect or the first to the eighth possible implementations of the third aspect, in a ninth possible implementation of the third aspect, the first pilot sequence is in one-to-one correspondence with the second pilot sequence.

With reference to the ninth possible implementation of the third aspect, in a tenth possible implementation of the third aspect, the second pilot sequence is a sub-sequence combination including multiple sub-sequences.

With reference to the tenth possible implementation of the third aspect, in an eleventh possible implementation of the third aspect, the second mapping module is specifically configured to map at least two of the multiple sub-sequences included in the second pilot sequence to a same second OFDM symbol of the grant free transmission resource.

With reference to the eleventh possible implementation of the third aspect, in a twelfth possible implementation of the third aspect, the second mapping module is specifically configured to map all the multiple sub-sequences included in the second pilot sequence to a same second OFDM symbol of the grant free transmission resource.

With reference to the eleventh possible implementation of the third aspect, in a thirteenth possible implementation of the third aspect, the second mapping module is specifically configured to separately map at least two of the multiple sub-sequences included in the second pilot sequence to different subbands of a same second OFDM symbol of the grant free transmission resource.

With reference to the tenth possible implementation of the third aspect, in a fourteenth possible implementation of the third aspect, the second mapping module is specifically configured to separately map all the multiple sub-sequences included in the second pilot sequence to different second OFDM symbols of the grant free transmission resource.

With reference to the fourteenth possible implementation of the third aspect, in a fifteenth possible implementation of the third aspect, the second mapping module is specifically configured to separately map all the multiple sub-sequences included in the second pilot sequence to entire frequency bands of the different second OFDM symbols of the grant free transmission resource, where the second OFDM symbols are different from the first OFDM symbol.

With reference to any one of the tenth to the fifteenth possible implementations of the third aspect, in a sixteenth possible implementation of the third aspect, the second pilot sequence is generated by using multiple cyclic shift values, and the multiple cyclic shift values are in one-to-one correspondence with the multiple sub-sequences.

With reference to any one of the third aspect or the first to the sixteenth possible implementations of the third aspect, in a seventeenth possible implementation of the third aspect, the second mapping module is specifically configured to repeatedly map the second pilot sequence to different second OFDM symbols of the grant free transmission resource.

With reference to any one of the third aspect or the first to the seventeenth possible implementations of the third aspect, in an eighteenth possible implementation of the third aspect, the grant free transmission resource is a transmission resource combining time and frequency, or a transmission resource combining time, frequency, and code domains.

With reference to any one of the third aspect or the first to the eighteenth possible implementations of the third aspect, in a nineteenth possible implementation of the third aspect, the first determining module is specifically configured to select the first pilot sequence from a first pilot sequence set.

With reference to any one of the third aspect or the first to the nineteenth possible implementations of the third aspect, in a twentieth possible implementation of the third aspect, the second determining module is specifically configured to select the second pilot sequence from a second pilot sequence set.

With reference to any one of the third aspect or the first to the twentieth possible implementations of the third aspect, in a twenty-first possible implementation of the third aspect, the method is applied to device-to-device D2D communication, machine to machine M2M communication, or machine type communication.

With reference to any one of the third aspect or the first to the twenty-first possible implementations of the third aspect, in a twenty-second possible implementation of the third aspect, the apparatus is a terminal device.

According to a fourth aspect, a pilot sequence transmission apparatus is provided, where the apparatus includes: a first detection module, configured to detect, on a first orthogonal frequency division multiplexing OFDM symbol of a grant free transmission resource, a first pilot sequence sent by a terminal device, where the first pilot sequence is used to indicate whether the terminal device is in an active state; a second detection module, configured to detect, on a second OFDM symbol of the grant free transmission resource, a second pilot sequence that is sent by the terminal device and that corresponds to the first pilot sequence detected by the first detection module, where the second pilot sequence is used for uplink data demodulation; and a processing module, configured to demodulate uplink data according to the second pilot sequence detected by the second detection module.

With reference to the fourth aspect, in a first possible implementation of the fourth aspect, the first detection module is specifically configured to detect the first pilot sequence in a part of a subband of the first OFDM symbol of the grant free transmission resource.

With reference to the first possible implementation of the fourth aspect, in a second possible implementation of the fourth aspect, an element of the first pilot sequence is a non-zero element.

With reference to the first possible implementation of the fourth aspect, in a third possible implementation of the fourth aspect, the first pilot sequence includes a first pilot sub-sequence and a second pilot sub-sequence, each element of the first pilot sub-sequence is a zero element, and an element of the second pilot sub-sequence is a non-zero element.

With reference to any one of the first to the third possible implementations of the fourth aspect, in a fourth possible implementation of the fourth aspect, the first detection module is specifically configured to detect the first pilot sequence in a first subband of the first OFDM symbol of the grant free transmission resource, where the first subband includes M resource elements REs, a non-zero symbol formed after the non-zero element is mapped is an M-order Walsh code, and M is a positive integer and is an exponential power of 2.

With reference to the fourth possible implementation of the fourth aspect, in a fifth possible implementation of the fourth aspect, the REs included in the first subband are M consecutive REs.

With reference to any one of the fourth aspect or the first to the fifth possible implementations of the fourth aspect, in a sixth possible implementation of the fourth aspect, the first pilot sequence is in one-to-one correspondence with the second pilot sequence.

With reference to the sixth possible implementation of the fourth aspect, in a seventh possible implementation of the fourth aspect, the second pilot sequence is a sub-sequence combination including multiple sub-sequences.

With reference to the seventh possible implementation of the fourth aspect, in an eighth possible implementation of the fourth aspect, at least two of the multiple sub-sequences included in the second pilot sequence are sub-sequences mapped to a same second OFDM symbol of the grant free transmission resource.

With reference to the eighth possible implementation of the fourth aspect, in a ninth possible implementation of the fourth aspect, all the multiple sub-sequences included in the second pilot sequence are sub-sequences mapped to a same second OFDM symbol of the grant free transmission resource.

With reference to the eighth possible implementation of the fourth aspect, in a tenth possible implementation of the fourth aspect, at least two of the multiple sub-sequences included in the second pilot sequence are sub-sequences separately mapped to different subbands of a same second OFDM symbol of the grant free transmission resource.

With reference to the seventh possible implementation of the fourth aspect, in an eleventh possible implementation of the fourth aspect, all the multiple sub-sequences included in the second pilot sequence are sub-sequences separately mapped to different second OFDM symbols of the grant free transmission resource.

With reference to the eleventh possible implementation of the fourth aspect, in a twelfth possible implementation of the fourth aspect, all the multiple sub-sequences included in the second pilot sequence are sub-sequences separately mapped to entire frequency bands of the different second OFDM symbols of the grant free transmission resource, and the second OFDM symbols are different from the first OFDM symbol.

With reference to any one of the seventh to the twelfth possible implementations of the fourth aspect, in a thirteenth possible implementation of the fourth aspect, the second pilot sequence is represented by multiple cyclic shift values, and the multiple cyclic shift values are in one-to-one correspondence with the multiple sub-sequences.

With reference to any one of the fourth aspect or the first to the thirteenth possible implementations of the fourth aspect, in a fourteenth possible implementation of the fourth aspect, the grant free transmission resource is a transmission resource combining time and frequency, or a transmission resource combining time, frequency, and code domains.

With reference to any one of the fourth aspect or the first to the fourteenth possible implementations of the fourth aspect, in a fifteenth possible implementation of the fourth aspect, the method is applied to device-to-device D2D communication, machine to machine M2M communication, or machine type communication.

With reference to any one of the fourth aspect or the first to the fifteenth possible implementations of the fourth aspect, in a sixteenth possible implementation of the fourth aspect, the apparatus is a network device.

Based on the foregoing technical solutions, in the pilot sequence transmission method and apparatus in the embodiments of the present disclosure, a terminal device determines a first pilot sequence used to indicate whether the terminal device is in an active state and determines a second pilot sequence used for uplink data demodulation, respectively maps the first pilot sequence and the second pilot sequence to a first OFDM symbol and a second OFDM symbol of a grant free transmission resource, and sends the first pilot sequence and the second pilot sequence by using the first OFDM symbol and the second OFDM symbol. Therefore, a network device can determine activeness of the terminal device by detecting the first pilot sequence, and can detect only a second pilot sequence of a terminal device that is in an active state, and does not need to detect all possible second pilot sequences, so that a quantity of detected pilots can be significantly reduced, and pilot detection complexity is reduced.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that, in a current cellular communications system, for example, a Global System for Mobile Communications (GSM) system, a Wideband Code Division Multiple Access (WCDMA) system, or a Long Term Evolution (LTE) system, supported communication is mainly voice communication and data communication. Usually, a quantity of connections supported by a conventional base station is limited, and is easy to be implemented.

A next-generation mobile communications system not only supports conventional voice communication and data communication, but also supports machine to machine (M2M) communication that is also referred to as machine type communication (MTC). According to prediction, by 2020, a quantity of MTC devices connected to networks may reach 50 to 100 billion, and this may far exceed a current quantity of connections.

For an MTC type service, because service types of the MTC type service differ from each other, network requirements differ greatly. Generally, there may be two services having the following requirements: One is a service that requires reliable transmission but is not sensitive to a delay, and the other is a service that requires a low delay and high-reliability transmission. It is relatively easy to process the service that requires reliable transmission but is not sensitive to a delay. However, for the service that requires a low delay and high-reliability transmission, if transmission is unreliable, retransmission is caused and an excessively large transmission delay is caused, and consequently, the requirements cannot be satisfied.

Because there are a large quantity of connections, a future wireless communications system greatly differs from an existing communications system. The large quantity of connections need to consume more resources to connect to terminal devices, and need to consume more resources to transmit scheduling signaling related to data transmission of the terminal devices.

Figure 1:
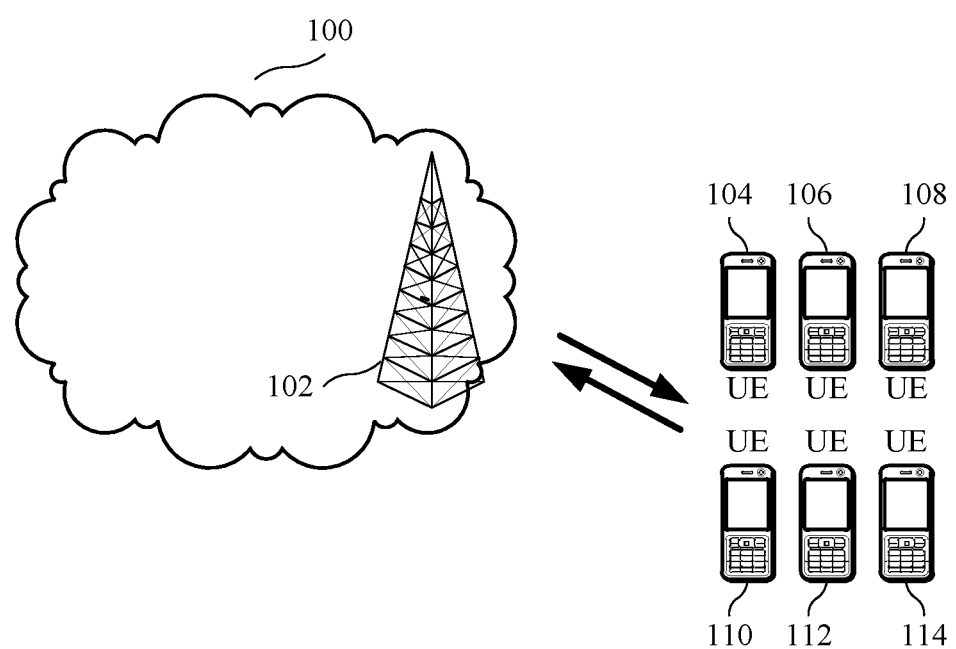
FIG. 1 is a schematic diagram of an application scenario according to an embodiment of the present disclosure.

FIG. 1 is a schematic diagram of a communications system to which the embodiments of the present disclosure are applied. As shown in FIG. 1, a network 100 includes a network device 102 and terminal devices 104, 106, 108, 110, 112, and 114 (briefly referred to as UE in the figure). The network device is connected to the terminal devices in a wired manner or a wireless manner or another manner. It should be understood that in an example of FIG. 1 for description, the network includes only one network device, but the embodiments of the present disclosure are not limited thereto. For example, the network may further include more network devices. Similarly, the network may further include more terminal devices, and the network device may further include another device.

The network in the embodiments of the present disclosure may be a public land mobile network (PLMN), a device-to-device (D2D) network, an M2M network, or another network. FIG. 1 is merely an example of a simplified schematic diagram. The network may further include another network device not shown in FIG. 1.

The terminal device in the embodiments of the present disclosure may be a user equipment (UE), an access terminal, a subscriber unit, a subscriber station, a mobile site, a mobile station, a remote site, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) site, a personal digital assistant (PDA), a handheld device having a wireless communications function, a computing device or another processing device connected to a wireless modem, a vehicle-mounted device, a wearable device, a terminal device in a future 5G network, a terminal device in a future evolved PLMN network, or the like.

The network device in the embodiments of the present disclosure may be a device configured to communicate with the terminal device. The network device may be a base station transceiver station (BTS) in GSM or code division multiple access (CDMA), or may be a NodeB (NB) in a wideband code division multiple access (WCDMA) system, or may be an evolved NodeB (eNB or eNodeB) in a Long Term Evolution (LTE) system, or may be a radio controller in a cloud radio access network (CRAN) scenario, or the network device may be a relay site, an access point, a vehicle-mounted device, a wearable device, a network device in a future 5G network, a network device in a future evolved PLMN network, or the like.

To handle a large quantity of MTC type services in a future network and satisfy low-delay and high-reliability service transmission, this patent proposes a grant free transmission solution. English for grant free transmission may be represented by grant free. The grant free transmission herein may be for uplink data transmission. The grant free transmission may be understood as any one of or more of the following meanings, or a combination of partial technical features of multiple meanings, or another similar meaning.

Grant free transmission may be: A network device pre-allocates multiple transmission resources to a terminal device and notify the terminal device of the multiple transmission resources; when having an uplink data transmission requirement, the terminal device selects at least one transmission resource from the multiple transmission resources pre-allocated by the network device, and sends uplink data by using the selected transmission resource; and the network device detects, on one or more transmission resources in the pre-allocated multiple transmission resources, the uplink data sent by the terminal device. The detection may be blind detection, or may be detection performed according to a particular control field in the uplink data, or detection performed in another manner.

Grant free transmission may be: A network device pre-allocates multiple transmission resources to a terminal device and notify the terminal device of the multiple transmission resources, so that when having an uplink data transmission requirement, the terminal device selects at least one transmission resource from the multiple transmission resources pre-allocated by the network device, and sends uplink data by using the selected transmission resource.

Grant free transmission may be: Information about multiple pre-allocated transmission resources is obtained, and when uplink data transmission is required, at least one transmission resource is selected from the multiple transmission resources, and uplink data is sent by using the selected transmission resource. The information may be obtained from a network device.

Grant free transmission may be a method for transmitting uplink data by a terminal device without dynamic scheduling of a network device. The dynamic scheduling may be a scheduling manner in which the network device indicates a transmission resource for the terminal device by using signaling in each time of uplink data transmission. Optionally, transmitting uplink data by the terminal device may be understood as: Two or more terminal devices are allowed to transmit uplink data on a same time-frequency resource. Optionally, the transmission resource may be a transmission resource in one or more transmission time units after a moment at which UE receives the signaling. One transmission time unit may be a smallest time unit of one time of transmission, for example, a transmission time interval (TTI), and a value may be 1 ms. Alternatively, one transmission time unit may be a preset transmission time unit.

Grant free transmission may be: A terminal device transmits uplink data without a grant of a network device. The grant may be: The terminal device sends an uplink scheduling request to the network device, and after receiving the scheduling request, the network device sends an uplink grant to the terminal device. The uplink grant indicates an uplink transmission resource allocated to the terminal device.

Grant free transmission may be a contention transmission manner, and specifically, may be: Multiple terminals transmit uplink data on a same pre-allocated time-frequency resource at the same time without a grant of a base station.

The data may include service data or signaling data.

The blind detection may be understood as: When whether data arrives is not known in advance, data that may arrive is detected. The blind detection may be understood as detection without explicit signaling indication.

The transmission resource may include but is not limited to one of or a combination of multiple of the following resources:
  a time domain resource, for example, a radio frame, a subframe, or a symbol;
  a frequency domain resource, for example, a subcarrier or a resource block;
  a spatial domain resource, for example, a transmit antenna or a beam;
  a code domain resource, for example, a sparse code multiple access (SCMA) code book, a low density signature (LDS) sequence, or a CDMA code; or
  an uplink pilot resource.

Transmission of the foregoing transmission resource may include but is not limited to the following control mechanisms:
  uplink power control, for example, control of an upper limit of uplink transmit power;
  modulation and coding scheme setting, for example, transport block size setting, bit rate setting, or modulation order setting; and
  a retransmission mechanism, for example, an HARQ mechanism.

A contention transmission unit (CTU) may be a basic transmission resource for grant free transmission. The CTU may be a transmission resource combining time, frequency, and code domains, or may be a transmission resource combining time, frequency, and a pilot, or may be a transmission resource combining time, frequency, code domain, and a pilot.

An access region of the CTU may be a time-frequency region used for grant free transmission, and may further be a time-frequency region corresponding to the CTU.

A patent application No. PCT/CN2014/073084 and entitled "SYSTEM AND METHOD FOR UPLINK GRANT-FREE TRANSMISSION SCHEME" has given a technical solution of uplink grant free transmission. In the application PCT/CN2014/073084, wireless resources may be divided into various CTUs, and UE is mapped to a particular CTU. A group of code may be allocated to each CTU, and the allocated group of code may be a group of CDMA code, or may be an SCMA code book set, an LDS sequence group, a signature group, or the like. Each code may correspond to one group of pilots. A user may select a code and a pilot in a pilot group corresponding to the code, to perform uplink transmission. It may be understood that application content of PCT/CN2014/073084 may be incorporated as a part of content of the embodiments of the present disclosure by reference, and details are not described herein.

An application scenario of the embodiments of the present disclosure is described above with reference to FIG. 1. In the following, a pilot sequence transmission method in the embodiments of the present disclosure is described from a terminal device side with reference to FIG. 2 to FIG. 4F.

Figure 2:
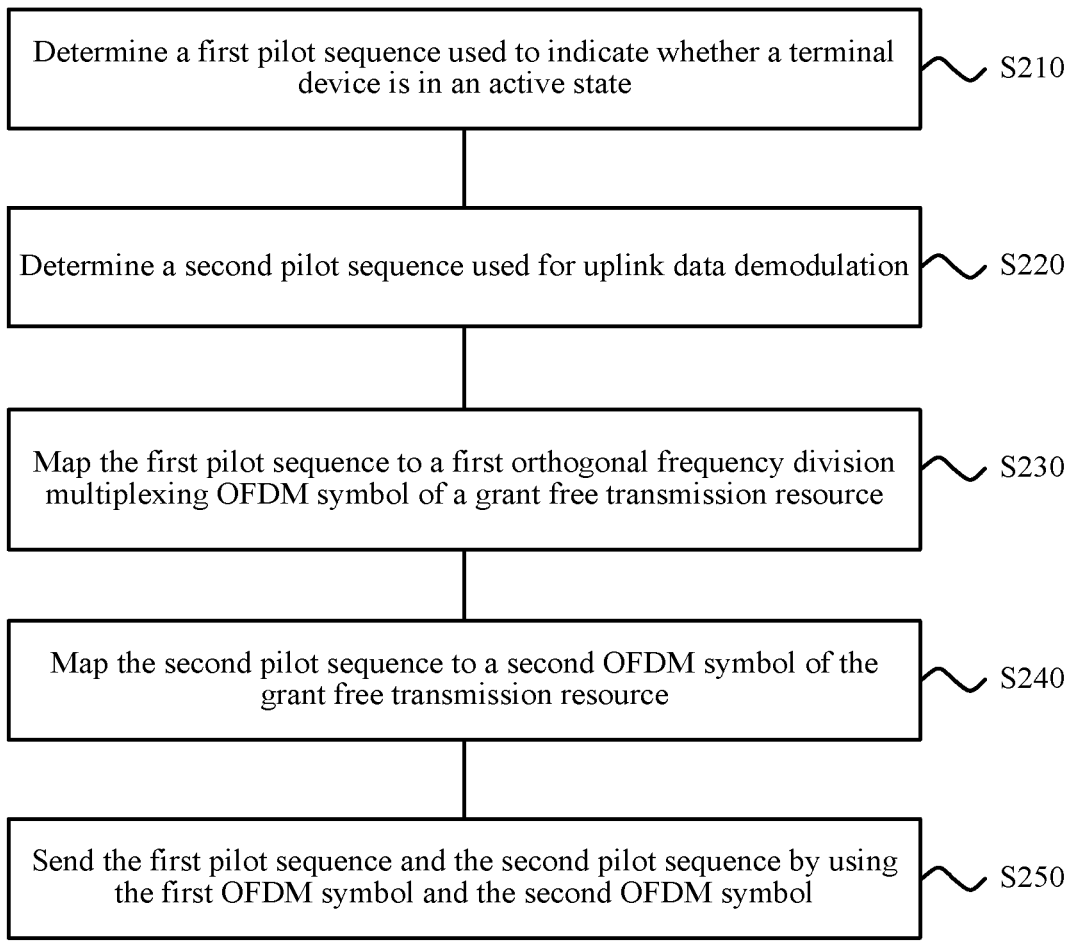
FIG. 2 is a schematic block diagram of a pilot sequence transmission method according to an embodiment of the present disclosure.

FIG. 2 shows a pilot sequence transmission method 200 according to an embodiment of the present disclosure. The method 200, for example, may be performed by a terminal device. As shown in FIG. 2, the method 200 includes the following steps.

S210: Determine a first pilot sequence used to indicate whether the terminal device is in an active state. Optionally, the determining a first pilot sequence used to indicate whether the terminal device is in an active state may be: selecting, by the terminal device, the first pilot sequence from a first pilot sequence set, or may be: determining, by the terminal device, the first pilot sequence by means of calculation according to a formula or in another manner.

S220: Determine a second pilot sequence used for uplink data demodulation. Optionally, the determining a second pilot sequence used for uplink data demodulation may be: selecting the second pilot sequence from a second pilot sequence set, or may be: determining, by the terminal device, the second pilot sequence by means of calculation according to a formula or in another manner.

S230: Map the first pilot sequence to a first orthogonal frequency division multiplexing OFDM symbol of a grant free transmission resource.

S240: Map the second pilot sequence to a second OFDM symbol of the grant free transmission resource.

S250: Send the first pilot sequence and the second pilot sequence by using the first OFDM symbol and the second OFDM symbol.

Specifically, in a grant free transmission system, there are a large quantity of terminal devices, but at the same time, there are an extremely small quantity of terminal devices that access a network, that is, an extremely small quantity of terminal devices are in an active state. Because the terminal device may randomly select a grant free transmission resource to send data, a network device does not know in advance which terminal devices are terminal devices that are in an active state. Therefore, the network device needs to detect every possible pilot, to determine a terminal device that is in an active state. Complexity of this detection process is extremely high.

To reduce pilot detection complexity of the network device, in a grant free access process of the terminal device, the terminal device may select the grant free transmission resource. For example, the terminal device may select a CTU. To transmit uplink data, the terminal device may determine the first pilot sequence and the second pilot sequence. The first pilot sequence is used to indicate a status of the terminal device, for example, used to indicate whether the terminal device is in an active state. The second pilot sequence is used for uplink data demodulation. Specifically, it may be understood that the second pilot sequence is used for channel estimation, so that uplink data is demodulated according to a channel estimation result. Further, the terminal device may respectively map the first pilot sequence and the second pilot sequence to the first OFDM symbol and the second OFDM symbol of the grant free transmission resource, and send the first pilot sequence and the second pilot sequence by using the first OFDM symbol and the second OFDM symbol.

Correspondingly, the network device may detect the first pilot sequence on the first OFDM symbol. When the network device detects the first pilot sequence, the network device may determine that the terminal device sending the first pilot sequence is in an active state, so that the network device may detect, on the second OFDM symbol, only the second pilot sequence corresponding to the first pilot sequence. That is, the network device may detect only the second pilot sequence of the terminal device that is in an active state, and may perform channel estimation according to the second pilot sequence and further demodulate uplink data according to a channel estimation result, and the network device does not need to detect all possible second pilot sequences, so that a quantity of detected pilots can be significantly reduced, and pilot detection complexity is reduced.

Therefore, in the pilot sequence transmission method in this embodiment of the present disclosure, a terminal device determines a first pilot sequence used to indicate whether the terminal device is in an active state and determines a second pilot sequence used for uplink data demodulation, respectively maps the first pilot sequence and the second pilot sequence to a first OFDM symbol and a second OFDM symbol of a grant free transmission resource, and sends the first pilot sequence and the second pilot sequence by using the first OFDM symbol and the second OFDM symbol. Therefore, a network device can determine activeness of the terminal device by detecting the first pilot sequence, and can detect only a second pilot sequence of a terminal device that is in an active state, and does not need to detect all possible second pilot sequences, so that a quantity of detected pilots can be significantly reduced, and pilot detection complexity is reduced.

It should be understood that, in this embodiment of the present disclosure, a pilot sequence may be briefly referred to as a pilot or a pilot signal, or may be referred to as a reference signal (RS). Correspondingly, pilot sequence transmission may also be understood as pilot transmission or reference signal transmission. This embodiment of the present disclosure is described merely by using a pilot sequence as an example, but the present disclosure is not limited thereto.

It should be understood that, in this embodiment of the present disclosure, the first pilot sequence is used to indicate the status of the terminal device, that is, used to indicate a status of the terminal device that transmits the first pilot sequence. For example, the first pilot sequence is used to indicate whether the terminal device is in an active state. For another example, whether the terminal device sends the first pilot sequence may be used to indicate whether the terminal device is in an active state. The first pilot sequence may be a Walsh code, or may be another pilot sequence used by the network device to determine activeness or an active state of the terminal device. For example, the first pilot sequence is a Zadoff-Chu (ZC) sequence. For another example, the first pilot sequence is an activity detection reference signal (ADRS), but this embodiment of the present disclosure is not limited thereto.

It should be further understood that, in this embodiment of the present disclosure, the second pilot sequence is used for uplink data demodulation. Specifically, the second pilot sequence may be used by the network device for channel estimation, so that the network device demodulates uplink data sent by the terminal device. The second pilot sequence is, for example, a DMRS. Certainly, the second pilot sequence may be another pilot sequence used by the network device for uplink data demodulation, and this embodiment of the present disclosure is not limited thereto.

It should be further understood that, in this embodiment of the present disclosure, the grant free transmission resource may represent a time-frequency resource used to transmit data in grant free transmission, or the grant free transmission resource may represent a transmission resource combining time, frequency, and code domains in grant free transmission, or another transmission resource described above. For example, the grant free transmission resource is a CTU access region. It should be further understood that this embodiment of the present disclosure is described merely by using a CTU access region as an example, but the present disclosure is not limited thereto.

It should be further understood that, in this embodiment of the present disclosure, the first OFDM symbol is an OFDM symbol used to transmit the first pilot sequence in the grant free transmission resource. Therefore, the first OFDM symbol may also be referred to as a first pilot symbol. One grant free transmission resource may include one or more first OFDM symbols. The second OFDM symbol is an OFDM symbol used to transmit the second pilot sequence in the grant free transmission resource. Therefore, the second OFDM symbol may also be referred to as a second pilot symbol. One grant free transmission resource may include one or more second OFDM symbols. The first OFDM symbol and the second OFDM symbol may be completely the same, or may be completely different, or may have some same OFDM symbols. For example, the same OFDM symbols of the first OFDM symbol and the second OFDM symbol may not only be used to transmit the first pilot sequence, but may also be used to transmit the second pilot sequence.

Figure 3:
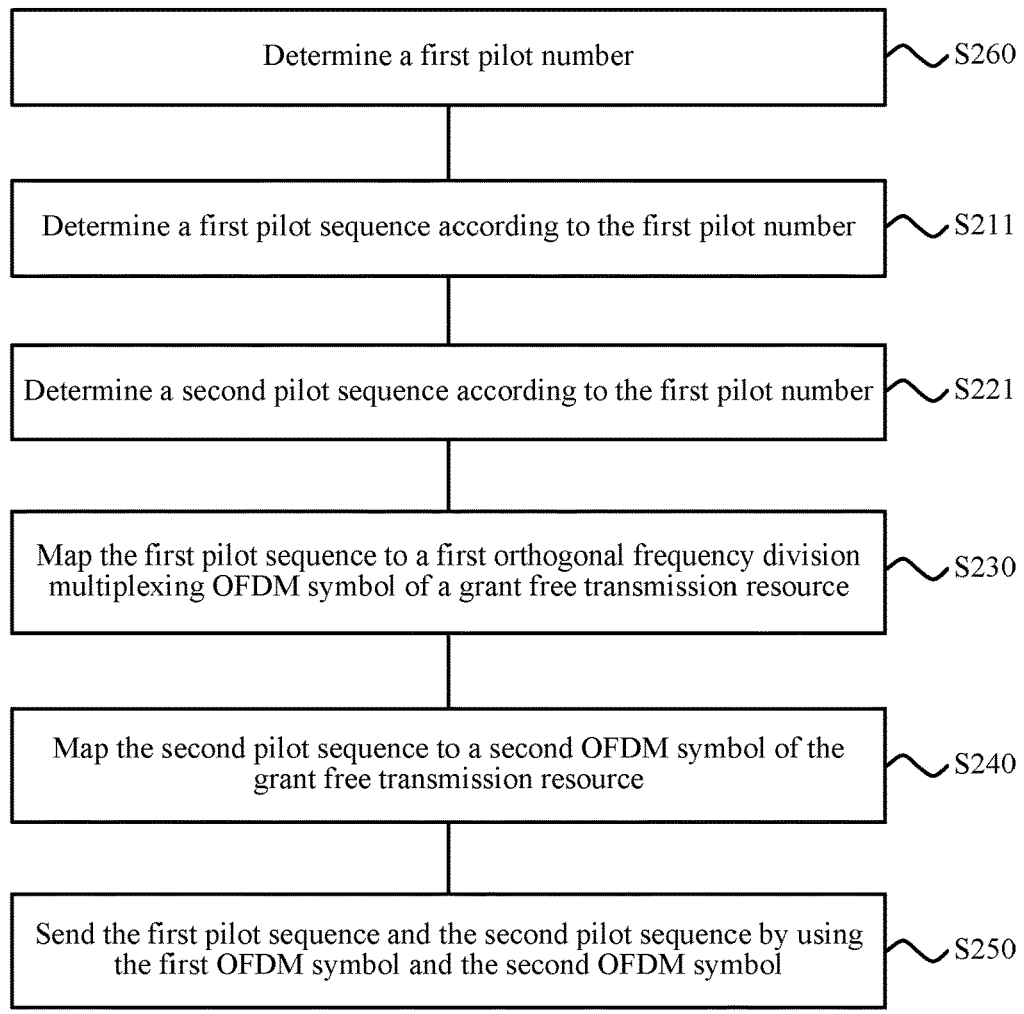
FIG. 3 is another schematic block diagram of a pilot sequence transmission method according to an embodiment of the present disclosure.

In this embodiment of the present disclosure, as shown in FIG. 3, optionally, the method 200 further includes:

S260: Determine a first pilot number.

The determining a first pilot sequence used to indicate whether a terminal device is in an active state includes:

S211: Determine the first pilot sequence according to the first pilot number.

The determining a second pilot sequence used for uplink data demodulation includes:

S221: Determine the second pilot sequence according to the first pilot number.

That is, in this embodiment of the present disclosure, in a grant free access process of the terminal device, the terminal device may select the grant free transmission resource. For example, the terminal device may select a CTU access region. To transmit uplink data, the terminal device may determine the first pilot number, and may thereby determine the first pilot sequence according to the first pilot number, and determine the second pilot sequence according to the first pilot number. That is, there is a correspondence between the first pilot sequence and the second pilot sequence. Further, the terminal device may respectively map the first pilot sequence and the second pilot sequence to the first OFDM symbol and the second OFDM symbol of the grant free transmission resource, and send the first pilot sequence and the second pilot sequence by using the first OFDM symbol and the second OFDM symbol.

Therefore, in the pilot sequence transmission method in this embodiment of the present disclosure, a terminal device determines a first pilot number, determines a first pilot sequence and a second pilot sequence according to the first pilot number, respectively maps the first pilot sequence and the second pilot sequence to a first OFDM symbol and a second OFDM symbol of a grant free transmission resource, and sends the first pilot sequence and the second pilot sequence by using the first OFDM symbol and the second OFDM symbol. Therefore, a network device can determine activeness of the terminal device by detecting the first pilot sequence, and can detect only the second pilot sequence corresponding to the first pilot sequence, and does not need to detect all possible second pilot sequences, so that a quantity of detected pilots can be significantly reduced, and pilot detection complexity is reduced.

It should be understood that this embodiment of the present disclosure is described merely by using an example in which the terminal device determines the first pilot sequence and the second pilot sequence according to the first pilot number, but the present disclosure is not limited thereto. For example, the terminal device may select a first pilot sequence from a first pilot sequence set, or the terminal device may select a second pilot sequence from a second pilot sequence set. For another example, the terminal device may select a first pilot sequence from a first pilot sequence set, and may thereby determine a second pilot sequence corresponding to the first pilot sequence. For another example, the terminal device may determine a first pilot sequence and a corresponding second pilot sequence in a correspondence table of a first pilot sequence and a second pilot sequence. For another example, the terminal device may determine a first pilot sequence according to a formula, and determine a corresponding second pilot sequence according to a correspondence between a first pilot sequence and a second pilot sequence.

It should be understood that, in this embodiment of the present disclosure, optionally, the terminal device may determine the first pilot sequence used to indicate whether the terminal device is in an active state, and determine, according to a correspondence between the first pilot sequence and the second pilot sequence, the second pilot sequence used for uplink data demodulation. Therefore, the terminal device may respectively map the first pilot sequence and the second pilot sequence to the first OFDM symbol and the second OFDM symbol of the grant free transmission resource, and send the first pilot sequence and the second pilot sequence by using the first OFDM symbol and the second OFDM symbol.

It should be further understood that sequence numbers of the foregoing processes do not mean execution sequences in various embodiments of the present disclosure. Execution sequences of the processes need to be determined according to functions and internal logic of the processes, and should not be construed as any limitation to implementation processes of the embodiments of the present disclosure.

In the following, the pilot sequence transmission method in this embodiment of the present disclosure is further described in detail with reference to FIG. 4A to FIG. 5F.

In S260, the terminal device determines the first pilot number. Specifically, for example, the terminal device may determine a pilot number in various manners, for example, by means of calculation, selection (for example, random selection), or table searching, or according to a system configuration parameter.

Optionally, in this embodiment of the present disclosure, the determining a first pilot number includes:

determining the first pilot number according to an identifier of the terminal device; or determining the first pilot number according to an identifier of the grant free transmission resource and an identifier of the terminal device; or generating the first pilot number by using a random number generator.

Specifically, in this embodiment of the present disclosure, the terminal device may determine the first pilot number according to the identifier of the terminal device. For example, the terminal device may use, as the first pilot number, a value that is obtained after 1 is added to a result of performing a modulo operation on a total quantity of terminal devices or a total quantity of first pilot sequences according to the identifier ID of the terminal device, or use, as the first pilot number, a value that is obtained after another operation is performed according to the ID of the terminal device. The identifier of the terminal device may be a subscriber identity inside a cell, for example, a cell radio network temporary identity (C-RNTI). Alternatively, the identifier of the terminal device may be a global subscriber identity, for example, an international mobile subscriber identity (IMSI) or a temporary mobile subscriber identity (TMSI).

It should be understood that this embodiment of the present disclosure is described merely by using the C-RNTI, the IMSI, and the TMSI as an example, but the present disclosure is not limited thereto. The identifier of the terminal device used to determine the first pilot number may be another subscriber identity. The present disclosure does not limit a specific method for determining the first pilot number according to the identifier of the terminal device. For example, the terminal device may determine the first pilot number according to a correspondence between an identifier of the terminal device and a pilot number. The correspondence between an identifier of the terminal device and a pilot number may be represented by a table, an algorithm, a formula, or the like.

In this embodiment of the present disclosure, the terminal device may further determine the first pilot number according to the identifier of the grant free transmission resource and the identifier of the terminal device. That is, when selecting different grant free transmission resources, a same terminal device may have different first pilot numbers. It should be further understood that this embodiment of the present disclosure is described merely by using this as an example, but the present disclosure is not limited thereto. For example, the terminal device may determine the first pilot number with reference to another factor. In another aspect, in this embodiment of the present disclosure, the terminal device may generate the first pilot number by using the random number generator, but the present disclosure is not limited thereto.

For example, in this embodiment of the present disclosure, the first pilot number i may be determined by using the following formula (1):

$$i = \mod(N_{ID}, N_k) \quad (1),$$

where mod( ) represents a modulo operation, $N_{ID}$ represents the ID of the terminal device, and $N_k$ represents a quantity of first pilot sequences of a kth grant free transmission resource.

It should be understood that this embodiment of the present disclosure is described merely by using the formula (1) as an example, but the present disclosure is not limited thereto. For example, a sum of a value determined according to the foregoing formula (1) and a determined natural number may be used as the first pilot number, or a difference between a value determined according to the foregoing formula (1) and a determined natural number may be used as the first pilot number.

In S211, the terminal device determines the first pilot sequence according to the first pilot number. Specifically, in this embodiment of the present disclosure, the terminal device may determine the first pilot sequence according to a correspondence between the first pilot number and the first pilot sequence. The correspondence may have multiple representation forms, for example, a formula or a table. That is, the terminal device may determine the first pilot sequence by performing an operation according to a formula, or may determine, by means of table searching, the first pilot sequence corresponding to the first pilot number. It should be understood that this embodiment of the present disclosure is described merely by using this as an example, but the present disclosure is not limited thereto.

For example, in this embodiment of the present disclosure, the terminal device may determine the first pilot sequence corresponding to the first pilot number from the first pilot sequence set. Optionally, a quantity of pilot sequences included in the first pilot sequence set is preset. Optionally, the quantity of pilot sequences included in the first pilot sequence set is the same as a quantity of resource elements (RE) used to transmit a pilot sequence in one grant free transmission resource.

For example, in this embodiment of the present disclosure, it is assumed that the grant free transmission resource is a contention transmission unit CTU access region, and for each CTU access region, there are two OFDM symbols that are used to transmit the first pilot sequence. Further, it is assumed that each OFDM symbol has Q resource elements REs, and for each CTU access region, the first pilot sequence set may include 2Q first pilot sequences. It should be understood that the first pilot sequence set may include more or fewer pilot sequences.

In this embodiment of the present disclosure, optionally, an element of the first pilot sequence is a non-zero element. In this embodiment of the present disclosure, because the first pilot sequence is used to indicate activeness of the terminal device, the first pilot sequence may be designed to have a relatively short length. Therefore, the non-zero element may be mapped to a part of a subband of the grant free transmission resource. That is, the terminal device may send the first pilot sequence on a part of a frequency resource of an OFDM symbol, and does not need to send the first pilot sequence over entire transmission bandwidth of the OFDM symbol. Therefore, in one aspect, pilot overheads can be significantly reduced, and in another aspect, a relatively short first pilot sequence facilitates detection performed by the network device, so that pilot detection complexity can be further reduced.

In another aspect, in this embodiment of the present disclosure, optionally, the first pilot sequence includes a first pilot sub-sequence and a second pilot sub-sequence. Each element of the first pilot sub-sequence is a zero element, and an element of the second pilot sub-sequence is a non-zero element. The first pilot sequence may be mapped to a part of a subband of the grant free transmission resource, so that pilot overheads can be significantly reduced. Although compared with the first pilot sequence in the previous embodiment, the first pilot sequence in this embodiment has a larger length, each element of the first pilot sub-sequence is a zero element, and the first pilot sequence may be mapped into a zero symbol on the grant free transmission resource. Therefore, pilot detection complexity can also be reduced.

In this embodiment of the present disclosure, optionally, the non-zero element included in the first pilot sequence is mapped to M resource elements REs of the grant free transmission resource, a non-zero symbol formed after the non-zero element is mapped is an M-order Walsh code, and M is a positive integer and is an exponential power of 2. Optionally, the M REs are M consecutive REs, so that orthogonality between pilot sequences can be further enhanced.

It should be understood that this embodiment of the present disclosure is described merely by using the Walsh code as an example, but the present disclosure is not limited thereto. For example, the first pilot sequence may be a pseudo-noise sequence that is also referred to as a PN sequence, or the first pilot sequence may be a Zadoff-Chu (ZC) sequence or an M sequence.

It should be further understood that, in this embodiment of the present disclosure, if the first pilot sequence is a Zadoff-Chu sequence, terminal devices mapped to a same subband may be distinguished by using cyclic shift values and root numbers. If the first pilot sequence is an M sequence, terminal devices mapped to a same subband may be distinguished by using cyclic shift values, that is, first pilot sequences of the terminal devices mapped to the same subband correspond to different cyclic shift values.

Correspondingly, in S230, the terminal device maps the first pilot sequence to the first orthogonal frequency division multiplexing OFDM symbol of the grant free transmission resource.

It should be understood that, in this embodiment of the present disclosure, the first OFDM symbol is an OFDM symbol used to transmit the first pilot sequence in the grant free transmission resource. Therefore, the first OFDM symbol may also be referred to as a first pilot symbol. One grant free transmission resource may include one or more first OFDM symbols. For example, in this embodiment of the present disclosure, the grant free transmission resource is, for example, a CTU access region. A first OFDM symbol in one CTU access region may include two OFDM symbols. Further, for example, the first OFDM symbol in the CTU access region may include the third OFDM symbol and the tenth OFDM symbol of the CTU access region. It should be further understood that, in this embodiment of the present disclosure, first OFDM symbols of grant free transmission resources may include a same quantity of OFDM symbols or different quantities of OFDM symbols.

It should be further understood that this embodiment of the present disclosure is described merely by using this as an example, but the present disclosure is not limited thereto. For example, a first OFDM symbol in one CTU access region may include only one OFDM symbol, or a first OFDM symbol in one CTU access region may include three or more OFDM symbols.

Figure 4A:
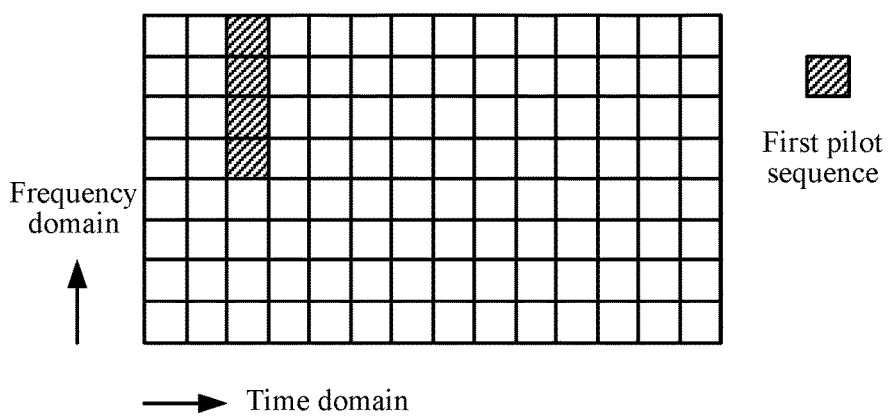
FIG. 4A to FIG. 4C are separately schematic diagrams showing distribution of a first pilot sequence on a time-frequency resource according to an embodiment of the present disclosure.

In this embodiment of the present disclosure, as shown in FIG. 4A, optionally, the mapping the first pilot sequence to a first orthogonal frequency division multiplexing OFDM symbol of a grant free transmission resource includes:

mapping the first pilot sequence to a part of a subband of the first OFDM symbol of the grant free transmission resource.

Specifically, as shown in FIG. 4A, the terminal device may map the first pilot sequence to a part of a subband of the third OFDM symbol, and the first pilot sequence does not occupy entire transmission bandwidth of the OFDM symbol, so that pilot overheads can be significantly reduced.

It should be understood that this embodiment of the present disclosure is described merely by using an example in which the first pilot sequence is mapped to four REs, but the present disclosure is not limited thereto. For example, the first pilot sequence may be mapped to two REs or eight REs. It should be further understood that this embodiment of the present disclosure is described merely by using an example in which the first pilot sequence is mapped to a part of a subband of one OFDM symbol, but the present disclosure is not limited thereto. For example, the first pilot sequence may be mapped to parts of subbands of two or more OFDM symbols.

Optionally, in this embodiment of the present disclosure, an element of the first pilot sequence mapped to the part of the subband of the OFDM symbol may be a non-zero element. Optionally, in this embodiment of the present disclosure, the first pilot sequence mapped to the part of the subband of the OFDM symbol may include a first pilot sub-sequence and a second pilot sub-sequence. Each element of the first pilot sub-sequence may be a zero element, and an element of the second pilot sub-sequence may be a non-zero element. It should be understood that, in this embodiment of the present disclosure, the first pilot sub-sequence including only a zero element is mapped into a zero symbol, and the second pilot sub-sequence including a non-zero element is mapped into a non-zero symbol.

Optionally, in this embodiment of the present disclosure, the mapping the first pilot sequence to a first orthogonal frequency division multiplexing OFDM symbol of a grant free transmission resource includes:

mapping the non-zero element included in the first pilot sequence to a first subband of the first OFDM symbol of the grant free transmission resource, where the first subband includes M resource elements REs, a non-zero symbol formed after the non-zero element is mapped is an M-order Walsh code, and M is a positive integer and is an exponential power of 2.

Optionally, in this embodiment of the present disclosure, the REs included in the first subband are M consecutive REs. That is, in this embodiment of the present disclosure, the first pilot sequence is preferably mapped to consecutive REs of a subband, so that better orthogonality between different first pilot sequences is achieved, and pilot detection reliability of a system can be further improved.

For example, it is assumed that 144 different first pilot sequences are configured for each CTU access region in total, that is, N=144. N represents a quantity of first pilot sequences used for a CTU access region. A length of each first pilot sequence is M, and a quantity of subcarriers in each CTU access region is K. A sequence whose index is m in an M-order Walsh code in the following Table 1, Table 2, or Table 3 is determined as a first pilot sequence corresponding to a first pilot number i according to the following formula (2):

$$m = \mathrm{mod}(\mathrm{mod}(i,K),M) \qquad (2),$$ where i is the first pilot number, $1 \le i \le N$, m is an integer and $0 \le m \le M-1$; mod( ) is a modulo operator; when M=2, the first pilot sequence corresponding to the first pilot number i is selected from a 2-order Walsh code in Table 1; when M=4, the first pilot sequence corresponding to the first pilot number i is selected from a 4-order Walsh code in Table 2; when M=8, the first pilot sequence corresponding to the first pilot number i is selected from an 8-order Walsh code in Table 3.

TABLE 1

| (M = 2) | |
| --- | --- |
| M | First pilot sequence |
| 0 | [+1 +1] |
| 1 | [+1 −1] |

TABLE 2

| (M = 4) | |
| --- | --- |
| M | First pilot sequence |
| 0 | [+1 +1 +1 +1] |
| 1 | [+1 +1 −1 −1] |
| 2 | [+1 −1 +1 −1] |
| 3 | [+1 −1 −1 +1] |

TABLE 3

| (M = 8) | |
| --- | --- |
| m | First pilot sequence |
| 0 | [+1 +1 +1 +1 +1 +1 +1 +1] |
| 1 | [+1 +1 +1 +1 −1 −1 −1 −1] |
| 2 | [+1 +1 −1 −1 +1 +1 −1 −1] |
| 3 | [+1 +1 −1 −1 −1 −1 +1 +1] |
| 4 | [+1 −1 +1 −1 −1 +1 −1 +1] |
| 5 | [+1 −1 +1 +1 −1 −1 +1 −1] |
| 6 | [+1 −1 −1 +1 −1 +1 +1 −1] |
| 7 | [+1 −1 +1 −1 +1 −1 +1 −1] |

For example, when the 2-order Walsh code whose length is 2 is used as the first pilot sequence, the corresponding first pilot sequence may be determined according to the formula (2) and Table 1. Similarly, when the 4-order Walsh code whose length is 4 is used as the first pilot sequence, the corresponding first pilot sequence may be determined according to the formula (2) and Table 2, and when the 8-order Walsh code whose length is 8 is used as the first pilot sequence, the corresponding first pilot sequence may be determined according to the formula (2) and Table 3.

It should be understood that this embodiment of the present disclosure is described merely by using Table 1 to Table 3 as an example, but the present disclosure is not limited thereto. For example, the first pilot sequence may be a Walsh code of another length, and the first pilot sequence may be another sequence.

For another example, it is assumed that a first OFDM symbol in one CTU access region may include the third OFDM symbol and the tenth OFDM symbol, and an $i^{th}$ first pilot sequence may be mapped to an $s^{th}$ to a $t^{th}$ subcarriers of an $a^{th}$ ADRS pilot symbol in the CTU access region according to the following formulas (3) to (5):

$$a=[i/K] \qquad (3),$$

$$s=[\mathrm{mod}(i,K)/M] \times M \qquad (4),$$

$$t=[\mathrm{mod}(i,K)/M] \times M + M - 1 \qquad (5),$$

where [ ] is a rounding down operator.

It should be understood that this embodiment of the present disclosure is described merely by using the foregoing formulas as an example, but the present disclosure is not limited thereto. For example, the rounding down operator in the foregoing formulas may be transformed into a rounding up operator.

In this embodiment of the present disclosure, reliability of determining a status of a terminal device is extremely important for a grant free transmission system. Therefore, reliability of transmitting a first pilot sequence may be improved by using a diversity technology.

Figure 4B:
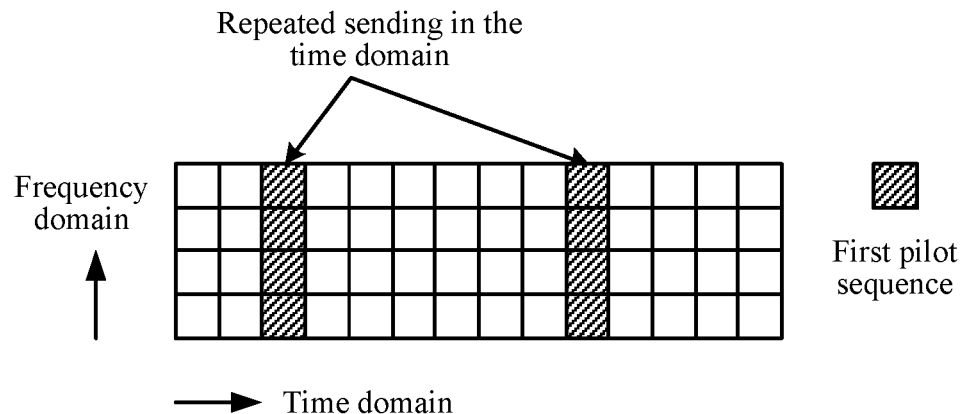
Figure 4C:
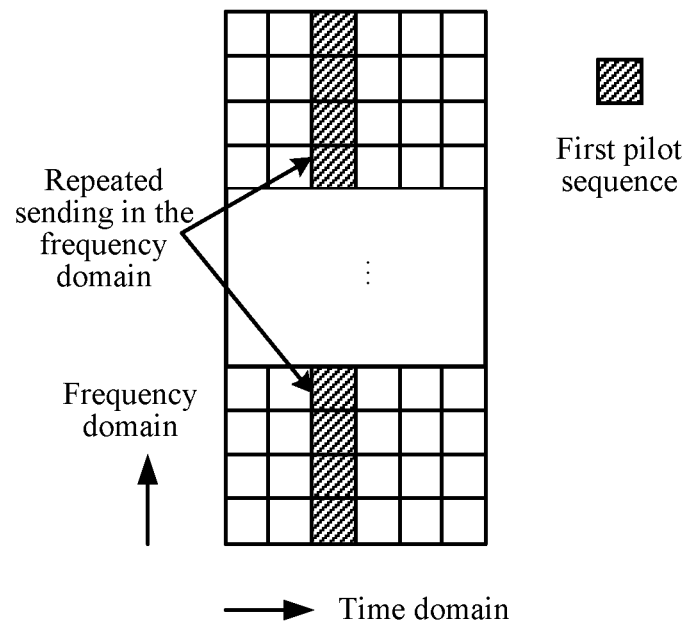

Optionally, as shown in FIG. 4B and FIG. 4C, in this embodiment of the present disclosure, optionally, the mapping the first pilot sequence to a first orthogonal frequency division multiplexing OFDM symbol of a grant free transmission resource includes:

repeatedly mapping the first pilot sequence to different first OFDM symbols of the grant free transmission resource; and/or repeatedly mapping the first pilot sequence to different subbands of the first OFDM symbol of the grant free transmission resource.

For example, as shown in FIG. 4B, same first pilot sequences are sent on the third OFDM symbol and the tenth OFDM symbol, so that time domain diversity can be implemented by sending the same first pilot sequences (for example, M-order Walsh codes) on the different first OFDM symbols. Similarly, as shown in FIG. 4C, same first pilot sequences (for example, M-order Walsh codes) are sent in different subbands of the third OFDM symbol, so that frequency domain diversity can be implemented.

It should be understood that, in this embodiment of the present disclosure, detection reliability can be significantly improved by means of time domain diversity or frequency domain diversity, but pilot overheads are increased at the same time. In addition, in this embodiment of the present disclosure, detection reliability may be improved by means of spatial diversity. For example, a quantity of receive antennas of a base station may be increased, so that the base station can separately detect signals received by using multiple receive antennas, and therefore, detection reliability can be improved without increasing pilot overheads. However, it should be understood that, in this embodiment of the present disclosure, a quantity of transmit antennas of the terminal device may be increased. That is, the terminal device respectively sends different first pilot sequences on different antennas. It may be considered that a corresponding terminal device is in an active state provided that the base station detects one of the first pilot sequences. In this manner, detection reliability can also be improved, but pilot overheads need to be increased.

It should be further understood that, in this embodiment of the present disclosure, different first pilot sequences may be distinguished in at least one of the following three manners: a time domain (an OFDM symbol), a frequency domain (a subcarrier group or a subband), or a code domain (a Walsh code or the like). For example, the first pilot sequences may be mapped to a same subband or different subbands of different OFDM symbols, to distinguish the first pilot sequences. Similarly, the first pilot sequences may be mapped to different subbands of a same OFDM symbol or different OFDM symbols, to distinguish the first pilot sequences. Further, if multiple first pilot sequences are mapped to a same time-frequency resource, different first pilot sequences mapped to the same time-frequency resource need to be orthogonal to each other. In this embodiment of the present disclosure, preferably, one first OFDM symbol includes multiple groups of resource elements REs or multiple subbands. Each first pilot sequence is preferably mapped to one group of REs or one subband of one first OFDM symbol, and different first pilot sequences on a same group of REs or in a same subband are orthogonal to each other. Further preferably, different first pilot sequences are orthogonal to each other.

Therefore, in the pilot sequence transmission method in this embodiment of the present disclosure, a terminal device determines a first pilot sequence used to indicate whether the terminal device is in an active state, maps the first pilot sequence to a first OFDM symbol of a grant free transmission resource, and sends the first pilot sequence by using the first OFDM symbol. Therefore, a network device can determine activeness of the terminal device by detecting the first pilot sequence, and can detect only a second pilot sequence of a terminal device that is in an active state, and does not need to detect all possible second pilot sequences, so that a quantity of detected pilots can be significantly reduced, and pilot detection complexity is reduced.

In S220, the terminal device determines the second pilot sequence used for uplink data demodulation. Specifically, the terminal device determines the second pilot sequence corresponding to the first pilot sequence.

For example, in this embodiment of the present disclosure, the terminal device may determine the second pilot sequence according to a correspondence between the first pilot sequence and the second pilot sequence. The correspondence may have multiple representation forms, for example, a formula or a table. That is, the terminal device may determine the second pilot sequence by performing an operation according to a formula, or may determine, by means of table searching, the second pilot sequence corresponding to the first pilot sequence. It should be understood that this embodiment of the present disclosure is described merely by using this as an example, but the present disclosure is not limited thereto.

In this embodiment of the present disclosure, optionally, when the correspondence between the first pilot sequence and the second pilot sequence is established by using the first pilot number, that the terminal device determines a second pilot sequence used for uplink data demodulation may include: The terminal device determines the second pilot sequence according to the first pilot number.

That is, in S221, the terminal device determines the second pilot sequence according to the first pilot number. Specifically, in this embodiment of the present disclosure, the terminal device may determine the second pilot sequence according to a correspondence between the first pilot number and the second pilot sequence. The correspondence may have multiple representation forms, for example, a formula or a table. That is, the terminal device may determine the second pilot sequence by performing an operation according to a formula, or may determine, by means of table searching, the second pilot sequence corresponding to the first pilot number. It should be understood that this embodiment of the present disclosure is described merely by using this as an example, but the present disclosure is not limited thereto. For example, in this embodiment of the present disclosure, the terminal device may determine the second pilot sequence corresponding to the first pilot number from the second pilot sequence set.

In this embodiment of the present disclosure, the first pilot sequence is used to indicate a status of the terminal device, and the second pilot sequence is used for uplink data demodulation. There may be a correspondence between the first pilot sequence and the second pilot sequence. Therefore, the network device may detect, by detecting the first pilot sequence, only the second pilot sequence corresponding to the first pilot sequence, and does not need to detect all possible second pilot sequences, so that a quantity of detected pilots can be significantly reduced, and pilot detection complexity is reduced. The correspondence between the first pilot sequence and the second pilot sequence may be a one-to-multiple correspondence, a multiple-to-one correspondence, or a one-to-one correspondence.

Specifically, in a first aspect, in this embodiment of the present disclosure, one first pilot sequence may correspond to multiple second pilot sequences, or one first pilot sequence may correspond to a group of second pilot sequences. The group of second pilot sequences may include two or more second pilot sequences. That is, the correspondence between the first pilot sequence and the second pilot sequence may be a one-to-multiple correspondence. Therefore, a quantity of first pilot sequences may be less than a quantity of second pilot sequences, so that overheads of the first pilot sequence can be reduced. However, it should be understood that, in this case, compared with a case in which there is a one-to-one correspondence between the first pilot sequence and the second pilot sequence, accuracy of detecting the first pilot sequence by the network device may be decreased, and at the same time, complexity of detecting the second pilot sequence by the network device may be increased.

Further, the terminal device may first determine the first pilot number, and determine the first pilot sequence and the second pilot sequence according to the first pilot number. One first pilot sequence may correspond to multiple second pilot sequences. For example, one pilot number may correspond to one first pilot sequence, and may correspond to multiple second pilot sequences; or multiple pilot numbers may respectively correspond to multiple second pilot sequences but all correspond to one first pilot sequence, that is, different pilot numbers may correspond to a same first pilot sequence but correspond to different second pilot sequences. Correspondingly, the network device may first detect the first pilot sequence on the first OFDM symbol. When the network device detects the first pilot sequence, the network device may determine that the terminal device sending the first pilot sequence is in an active state. Therefore, the network device may separately detect the multiple second pilot sequences corresponding to the first pilot sequence. Because the network device needs to separately detect only the multiple second pilot sequences corresponding to the first pilot sequence, and does not need to detect all possible second pilot sequences, a quantity of detected pilots can be significantly reduced, and pilot detection complexity is reduced.

In a second aspect, in this embodiment of the present disclosure, multiple first pilot sequences may correspond to one second pilot sequence, or a group of first pilot sequences may correspond to one second pilot sequence. The group of first pilot sequences may include two or more first pilot sequences. That is, the correspondence between the first pilot sequence and the second pilot sequence may be a multiple-to-one correspondence.

For example, the terminal device may first determine the first pilot number, and determine the first pilot sequence and the second pilot sequence according to the first pilot number. Multiple first pilot sequences may correspond to one second pilot sequence. For example, one pilot number may correspond to multiple first pilot sequences, and may correspond to one second pilot sequence; or multiple pilot numbers may respectively correspond to multiple first pilot sequences but all correspond to one second pilot sequence, that is, different pilot numbers may correspond to different first pilot sequences but correspond to a same second pilot sequence. Correspondingly, the network device may first detect the first pilot sequence on the first OFDM symbol. When the network device detects the first pilot sequence, the network device may determine that the terminal device sending the first pilot sequence is in an active state. Therefore, the network device may detect the second pilot sequence corresponding to the first pilot sequences. Because the network device needs to detect only the second pilot sequence corresponding to the first pilot sequences, and does not need to detect all possible second pilot sequences, a quantity of detected pilots can be significantly reduced, and pilot detection complexity is reduced.

In a third aspect, in this embodiment of the present disclosure, preferably, the first pilot sequence is in one-to-one correspondence with the second pilot sequence. For example, one pilot number may uniquely correspond to one first pilot sequence, and may uniquely correspond to one second pilot sequence. It should be understood that this embodiment of the present disclosure is described merely by using this as an example, but the present disclosure is not limited thereto. For example, multiple pilot numbers may correspond to one first pilot sequence, and the first pilot sequence may uniquely correspond to one second pilot sequence; or multiple pilot numbers may correspond to one second pilot sequence, and the second pilot sequence may uniquely correspond to one first pilot sequence.

Specifically, for example, the terminal device may first determine the first pilot number, determine the first pilot sequence according to the first pilot number, and determine the second pilot sequence in one-to-one correspondence with the first pilot sequence. Further, the terminal device may respectively map the first pilot sequence and the second pilot sequence to the first OFDM symbol and the second OFDM symbol of the grant free transmission resource, and send the first pilot sequence and the second pilot sequence by using the first OFDM symbol and the second OFDM symbol. Correspondingly, the network device may first detect the first pilot sequence on the first OFDM symbol. When the network device detects the first pilot sequence, the network device may determine that the terminal device sending the first pilot sequence is in an active state. Therefore, the network device may detect one second pilot sequence uniquely corresponding to the first pilot sequence, and does not need to detect all second pilot sequences, so that a quantity of detected pilots can be significantly reduced, and pilot detection complexity is reduced.

In an uplink grant free transmission system, the terminal device randomly selects the second pilot sequence used for uplink data demodulation. Because different terminal devices may select a same second pilot sequence, a pilot collision may occur. In this case, the network device considers that only one terminal device uses the second pilot sequence, and consequently cannot perform correct decoding. Therefore, to reduce a pilot collision probability, sufficient second pilot sequences are required for selection by a user.

However, in a current technology, uplink DMRSs are distinguished in a same OFDM symbol by using different cyclic shift values, and each OFDM symbol can support a maximum of 12 orthogonal pilots. To satisfy a sufficiently low pilot collision probability, hundreds or thousands of pilots are required, so that a quantity of OFDM symbols for sending DMRSs needs to be increased. However, simply increasing the quantity of OFDM symbols for sending DMRSs can far from satisfying an actual requirement. For example, one uplink subframe includes 14 OFDM symbols in total, and even if all the OFDM symbols are used to send DMRSs, only 14×12=168 pilots can be distinguished, and in this case, there are no other time-frequency resources used to send uplink data.

Therefore, in this embodiment of the present disclosure, to further reduce pilot overheads, multiple pilot sequences used for uplink data demodulation may be combined to form sufficient pilot sequences that can be distinguished from each other, so that not only a sufficiently low pilot collision probability can be satisfied, but pilot overheads can also be significantly reduced.

Specifically, in this embodiment of the present disclosure, optionally, the second pilot sequence is a sub-sequence combination including multiple sub-sequences. That is, in this embodiment of the present disclosure, there may be a one-to-multiple correspondence, a multiple-to-one correspondence, or a one-to-one correspondence between the first pilot sequence and the sub-sequence combination including two or more sub-sequences. The sub-sequence is, for example, a DMRS.

For example, if each OFDM symbol can support a maximum of S orthogonal pilot sequences, and the pilot sequences supported by each OFDM symbol are used as one element in the sub-sequence combination, that is, pilot sequences carried on each OFDM symbol are used as one sub-sequence in the sub-sequence combination, for D OFDM symbols, a maximum of $S^D$ different sub-sequence combinations may be formed, so that a quantity of available second pilot sequences in the system can be significantly increased. For example, according to parameter configuration of an existing system, each OFDM symbol can support S=12 orthogonal pilot sequences, and two OFDM symbols can support a maximum of $12^2$=144 different sub-sequence combinations, that is, 144 different second pilot sequences.

It should be understood that in an LTE system, it is assumed that each OFDM symbol used to transmit a DMRS corresponds to K resource elements REs, and for each OFDM symbol, different DMRSs may be distinguished by using different cyclic shift values $c_i$ of a base sequence b(k). As shown in the following formula (6), each cyclic shift value $c_i$ corresponds to one DMRS:

$$r(k)=b(k)e^{(-jkc_i)}, k=1, \ldots, K \qquad (6).$$

DMRSs corresponding to different cyclic shift values are orthogonal to each other.

Therefore, in this embodiment of the present disclosure, optionally, the second pilot sequence is generated by using multiple cyclic shift values. The multiple cyclic shift values are in one-to-one correspondence with the multiple sub-sequences. For example, in this embodiment of the present disclosure, an $i^{th}$ second pilot sequence may be represented by a cyclic shift value combination $(c_{i,1}, \ldots, c_{i,d}, \ldots, c_{i,D})$, where $c_{i,d}$ corresponds to a cyclic shift value of a sub-sequence on a $d^{th}$ OFDM symbol, d is a natural number, and D≥d≥1.

It should be further understood that this embodiment of the present disclosure is described merely by using an example in which a sub-sequence combination including multiple sub-sequences is used to increase a quantity of second pilot sequences, but the present disclosure is not limited thereto. For example, a method of increasing a quantity of pilot sequences supported by each second OFDM symbol may be used to satisfy a requirement of a sufficiently low pilot collision probability.

Therefore, in this embodiment of the present disclosure, multiple sub-sequences are combined to form the second pilot sequence, so that sufficient pilot sequences that may be distinguished from each other can be formed, and not only the requirement of a sufficiently low pilot collision probability can be satisfied, but pilot overheads can also be significantly reduced.

Correspondingly, in S240, the terminal device maps the second pilot sequence to the second orthogonal frequency division multiplexing OFDM symbol of the grant free transmission resource.

It should be understood that, in this embodiment of the present disclosure, the second OFDM symbol is an OFDM symbol used to transmit the second pilot sequence in the grant free transmission resource. Therefore, the second OFDM symbol may also be referred to as a second pilot symbol. One grant free transmission resource may include one or more second OFDM symbols. For example, in this embodiment of the present disclosure, the grant free transmission resource is, for example, a CTU access region. A second OFDM symbol in one CTU access region may include three OFDM symbols. Further, the second OFDM symbol in the CTU access region may include the second OFDM symbol, the eighth OFDM symbol, and the eleventh OFDM symbol of the CTU access region.

It should be further understood that, in this embodiment of the present disclosure, second OFDM symbols of grant free transmission resources may include a same quantity of OFDM symbols or different quantities of OFDM symbols. An OFDM symbol included in the first OFDM symbol may be the same as or different from an OFDM symbol included in the second OFDM symbol.

It should be further understood that this embodiment of the present disclosure is described merely by using this as an example, but the present disclosure is not limited thereto. For example, a second OFDM symbol in one CTU access region may include only one OFDM symbol, or a second OFDM symbol in one CTU access region may include two or more OFDM symbols.

In this embodiment of the present disclosure, multiple sub-sequences forming the sub-sequence combination may all be mapped to a same second OFDM symbol of the grant free transmission resource, or may be separately mapped to different second OFDM symbols of the grant free transmission resource, or may be partially mapped to a same second OFDM symbol of the grant free transmission resource. In the following, mapping of the second pilot sequence is described in detail with reference to FIG. 5A to FIG. 5F.

As shown in FIG. 5A to FIG. 5D, in this embodiment of the present disclosure, optionally, the mapping the second pilot sequence to a second OFDM symbol of the grant free transmission resource includes:

mapping at least two of the multiple sub-sequences included in the second pilot sequence to a same second OFDM symbol of the grant free transmission resource.

Specifically, in this embodiment of the present disclosure, at least two sub-sequences may be mapped to a same second OFDM symbol of the grant free transmission resource. For example, in FIG. 5A, both a sub-sequence 1 and a sub-sequence 2 are mapped to the fourth OFDM symbol of the grant free transmission resource, and both the sub-sequence 1 and the sub-sequence 2 are mapped to an entire frequency band of the OFDM symbol. For another example, in FIG. 5B and FIG. 5C, both a sub-sequence 1 and a sub-sequence 2 are mapped to the fourth OFDM symbol of the grant free transmission resource, and the sub-sequence 1 and the sub-sequence 2 are mapped to different subbands of the OFDM symbol. In FIG. 5B, the second pilot sequence further includes a sub-sequence 3, the sub-sequence 3 is mapped to the eleventh OFDM symbol of the grant free transmission resource, and the sub-sequence 3 is also mapped to a part of a frequency band of the OFDM symbol. In addition, in FIG. 5B and FIG. 5C, for each sub-sequence, a part of a frequency band or subband to which the sub-sequence is mapped is continuous. For another example, in FIG. 5D, a sub-sequence 1 and a sub-sequence 2 are mapped to different subbands of a same OFDM symbol. However, a part of a frequency band or subband to which the sub-sequence 1 or the sub-sequence 2 is mapped is discontinuous.

In this embodiment of the present disclosure, at least two sub-sequences may be mapped to a same second OFDM symbol of the grant free transmission resource. That is, all pilot sequences supported by an OFDM symbol may be further divided into multiple groups, and one pilot sequence may be selected from each group as one sub-sequence in a sub-sequence combination.

For example, it is assumed that for an uplink grant free transmission system, each grant free transmission resource has two OFDM symbols used to transmit the second pilot sequence, and the grant free transmission resource is, for example, a CTU access region. That is, each CTU access region includes two second OFDM symbols, and each second OFDM symbol can support 12 orthogonal pilot sequences. The pilot sequence is, for example, a DMRS. It is assumed that the second pilot sequence is a sub-sequence combination (A, B, C) including three sub-sequences A, B, and C. The sub-sequence A may be one of six DMRSs supported by the first second OFDM symbol, the sub-sequence B may be one of the other six DMRSs supported by the first second OFDM symbol, and the sub-sequence C may be one of 12 DMRSs supported by the second second OFDM symbol. That is, in the three sub-sequences included in the second pilot sequence, the sub-sequence A and the sub-sequence B are mapped to a same second OFDM symbol of the grant free transmission resource, and the sub-sequence C is mapped to the other second OFDM symbol of the grant free transmission resource. In this case, two second OFDM symbols included in each CTU access region can support a maximum of 6×6×2=432 different sub-sequence combinations. That is, each CTU access region can support 432 different second pilot sequences. Compared with the foregoing embodiment in which each CTU access region can support 144 different second pilot sequences, in this embodiment, each CTU access region can support more second pilot sequences, so that pilot overheads can be further reduced.

It should be understood that the foregoing embodiment is described merely by using an example in which two sub-sequences are mapped to a same second OFDM symbol of the grant free transmission resource, but the present disclosure is not limited thereto. When more sub-sequences are mapped to a same second OFDM symbol of the grant free transmission resource, a same grant free transmission resource can support more second pilot sequences, and pilot overheads can be further significantly reduced.

For example, it is assumed that the second pilot sequence is a sub-sequence combination (A, B, D, C) including four sub-sequences A, B, C, and D. The sub-sequence A may be one of a first group of four DMRSs supported by the first second OFDM symbol, the sub-sequence B may be one of a second group of four DMRSs supported by the first second OFDM symbol, and the sub-sequence D may be one of a third group of four DMRSs supported by the first second OFDM symbol, but the sub-sequence C is still one of 12 DMRSs supported by the second second OFDM symbol. In this case, two second OFDM symbols included in each CTU access region can support a maximum of 4×4×4×12=768 different second pilot sequences.

It should be understood that this embodiment of the present disclosure is described merely by using an example in which DMRSs supported by one second OFDM symbol are grouped. When DMRSs supported by each second OFDM symbol are grouped and therefore, the second pilot sequence includes more sub-sequences, each CTU access region can support more different second pilot sequences. For brevity, details are not described herein.

Figure 5A:
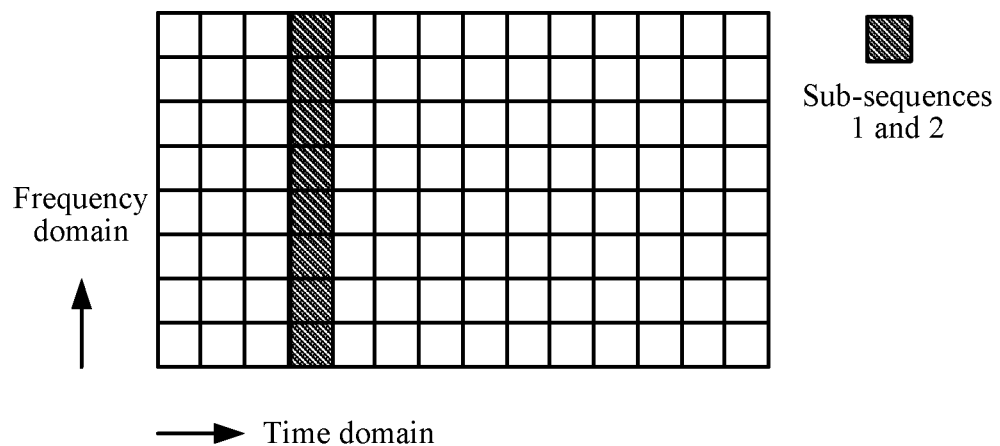
FIG. 5A to FIG. 5F are separately schematic diagrams showing distribution of a second pilot sequence on a time-frequency resource according to an embodiment of the present disclosure.
Figure 5B:
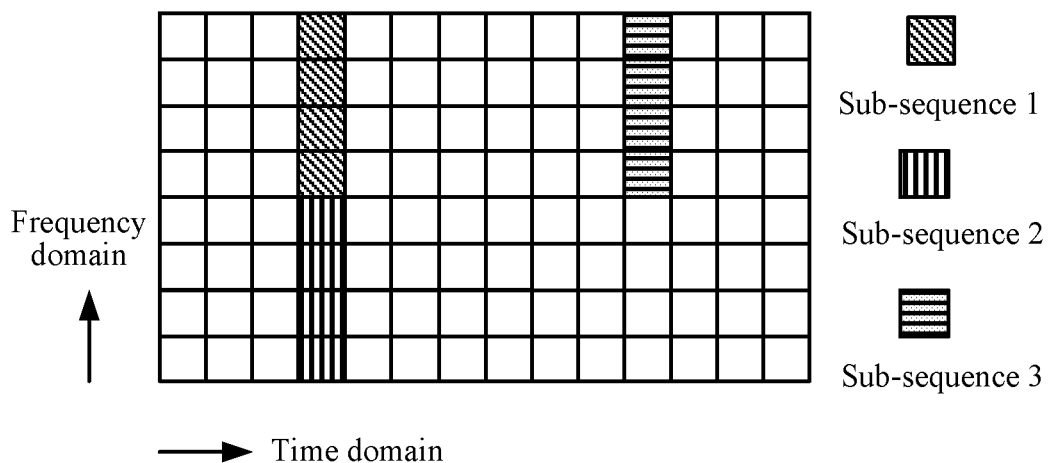

Further, in this embodiment of the present disclosure, optionally, as shown in FIG. 5A, the mapping the second pilot sequence to a second OFDM symbol of the grant free transmission resource includes:

mapping all the multiple sub-sequences included in the second pilot sequence to a same second OFDM symbol of the grant free transmission resource.

For example, in FIG. 5A, the second pilot sequence includes only a sub-sequence 1 and a sub-sequence 2, and both the two sub-sequences are mapped to the fourth OFDM symbol of the grant free transmission resource, so that the grant free transmission resource can support more second pilot sequences, and pilot overheads can be further reduced.

Figure 5C:
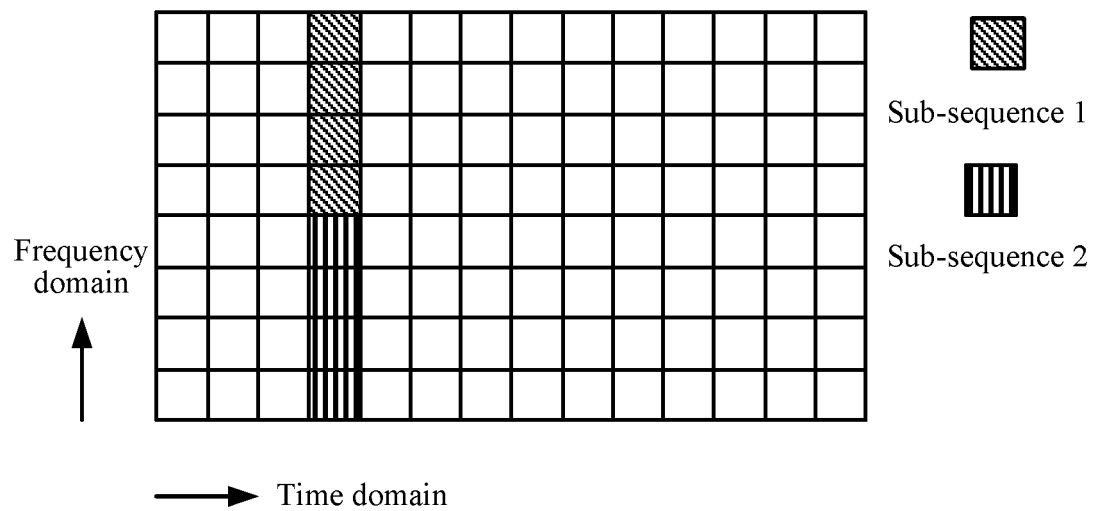
Figure 5D:
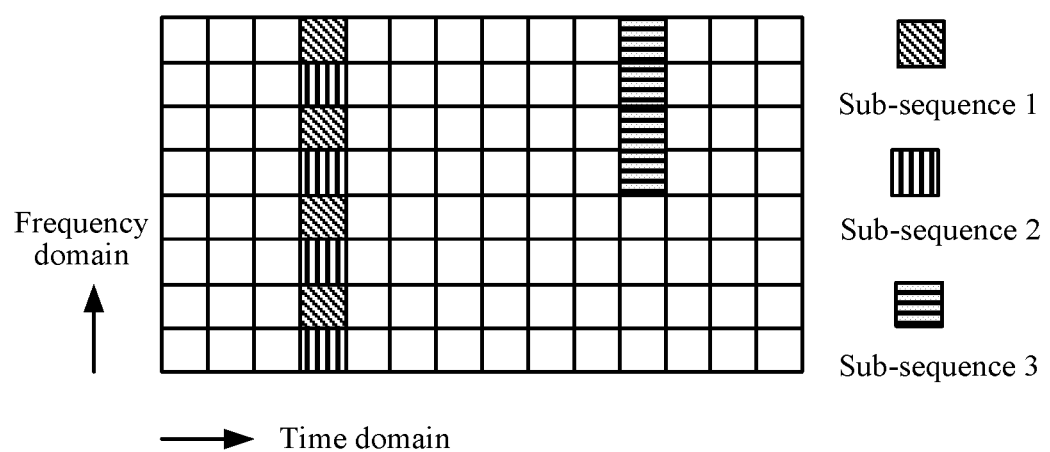

Further, in this embodiment of the present disclosure, optionally, as shown in FIG. 5B and FIG. 5C, the mapping the second pilot sequence to a second OFDM symbol of the grant free transmission resource includes:

separately mapping at least two of the multiple sub-sequences included in the second pilot sequence to different subbands of a same second OFDM symbol of the grant free transmission resource.

For example, in FIG. 5B and FIG. 5C, a sub-sequence 1 and a sub-sequence 2 included in the second pilot sequence are separately mapped to different subbands of the fourth OFDM symbol of the grant free transmission resource, so that time-frequency resource overheads of the system can be reduced, and pilot overheads of the system can be further reduced.

It should be understood that sub-sequences mapped to different subbands of the same second OFDM symbol may be the same or may be different.

Figure 5E:
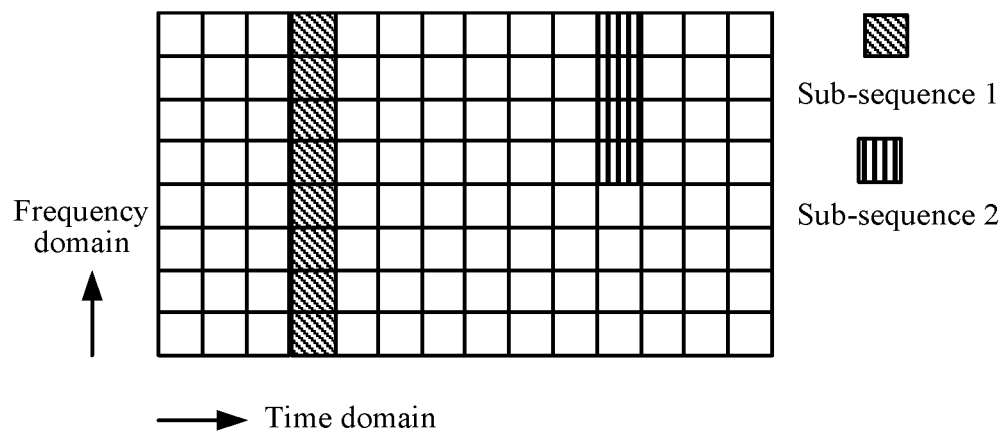
Figure 5F:
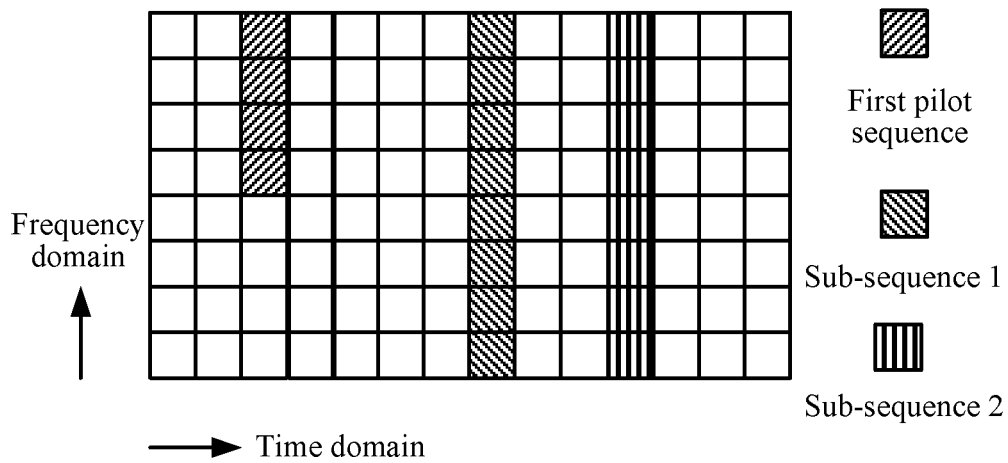

Further, in this embodiment of the present disclosure, optionally, as shown in FIG. 5E and FIG. 5F, the mapping the second pilot sequence to a second OFDM symbol of the grant free transmission resource includes:

separately mapping all the multiple sub-sequences included in the second pilot sequence to different second OFDM symbols of the grant free transmission resource.

For example, in FIG. 5E, the second pilot sequence includes a sub-sequence 1 and a sub-sequence 2. The sub-sequence 1 is mapped to the fourth OFDM symbol of the grant free transmission resource and the sub-sequence 2 is mapped to the eleventh OFDM symbol of the grant free transmission resource. In addition, the sub-sequence 1 is mapped to an entire frequency band of the fourth OFDM symbol and the sub-sequence 2 is mapped to a part of a frequency band of the eleventh OFDM symbol. For another example, in FIG. 5F, a sub-sequence 1 is mapped to an entire frequency band of the eighth OFDM symbol of the grant free transmission resource and a sub-sequence 2 is mapped to an entire frequency band of the eleventh OFDM symbol of the grant free transmission resource.

Preferably, in this embodiment of the present disclosure, as shown in FIG. 5F, the mapping the second pilot sequence to a second OFDM symbol of the grant free transmission resource includes:

separately mapping all the multiple sub-sequences included in the second pilot sequence to entire frequency bands of the different second OFDM symbols of the grant free transmission resource, where the second OFDM symbols are different from the first OFDM symbol.

Specifically, in FIG. 5F, the first pilot sequence is mapped to a part of a frequency band of the third OFDM symbol of the grant free transmission resource. The second pilot sequence includes a sub-sequence 1 and a sub-sequence 2. The sub-sequence 1 is mapped to an entire frequency band of the eighth OFDM symbol of the grant free transmission resource and the sub-sequence 2 is mapped to an entire frequency band of the eleventh OFDM symbol of the grant free transmission resource.

It should be understood that this embodiment of the present disclosure is described merely by using schematic mapping diagrams shown in FIG. 5A to FIG. 5F as an example, but the present disclosure is not limited thereto. For brevity, details are not described herein.

In this embodiment of the present disclosure, for the second pilot sequence, reliability of transmitting the second pilot sequence may be improved by using a diversity technology.

That is, in this embodiment of the present disclosure, optionally, the mapping the second pilot sequence to a second OFDM symbol of the grant free transmission resource includes:

repeatedly mapping the second pilot sequence to different second OFDM symbols of the grant free transmission resource.

It should be understood that, in this embodiment of the present disclosure, detection reliability can be significantly improved by means of time domain diversity or frequency domain diversity, but pilot overheads are increased at the same time. In addition, in this embodiment of the present disclosure, detection reliability may be improved by means of spatial diversity. For example, a quantity of receive antennas of the base station may be increased, so that the base station can separately detect signals received by using multiple receive antennas, and therefore, detection reliability can be improved without increasing pilot overheads. However, it should be understood that, in this embodiment of the present disclosure, a quantity of transmit antennas of the terminal device may be increased. That is, the terminal device respectively sends different first pilot sequences on different antennas. It may be considered that a corresponding terminal device is in an active state provided that the base station detects one of the first pilot sequences. In this manner, detection reliability can also be improved, but pilot overheads need to be increased.

It should be further understood that, in this embodiment of the present disclosure, different second pilot sequences may be distinguished in at least one of the following three manners: a time domain (an OFDM symbol), a frequency domain (a subcarrier group or a subband), or a code domain. For example, the second pilot sequences may be mapped to different OFDM symbols, to distinguish the second pilot sequences. Similarly, the second pilot sequences may be mapped to different subbands of an OFDM symbol, to distinguish the second pilot sequences. Further, if multiple second pilot sequences are mapped to a same time-frequency resource, different second pilot sequences mapped to the same time-frequency resource need to be orthogonal to each other. In addition, it should be further understood that, in this embodiment of the present disclosure, sub-sequences mapped to second OFDM symbols are not completely the same, so that the network device can perform correct channel estimation, to demodulate uplink data.

As described above, for example, in this embodiment of the present disclosure, the second pilot sequence may be represented by a cyclic shift value combination ($c_{i,1}, \ldots, c_{i,d}, \ldots, c_{i,D}$), where $c_{i,d}$ corresponds to a cyclic shift value of a sub-sequence on a $d^{th}$ OFDM symbol.

Description is provided still by using an example in which the first pilot sequence and the second pilot sequence are determined by using the first pilot number i. It is assumed that the grant free transmission resource is a CTU access region, a second OFDM symbol in one CTU access region may include two OFDM symbols, each OFDM symbol can support a maximum of 12 orthogonal DMRSs, each second pilot sequence is a sub-sequence combination including two sub-sequences, and the sub-sequences are separately mapped to entire frequency bands of different second OFDM symbols of the grant free transmission resource. One CTU access region supports a maximum of 144 second pilot sequences ($c_{i,1}, c_{i,2}$). Cyclic shift values $c_{i,1}$ and $c_{i,2}$ may be determined according to the following formulas: $c_{i,1}=\mod(i, 12)$, and $c_{i,2}=[i/12]$, where mod( ) is a modulo operator and [ ] is a rounding down operator.

It should be understood that this embodiment of the present disclosure is described merely by using the foregoing formulas as an example, but the present disclosure is not limited thereto. For example, the rounding down operator in the foregoing formula may be transformed into a rounding up operator.

In this embodiment of the present disclosure, if a quantity N of first pilot sequences is equal to a quantity $S^D$ of second pilot sequences, all possible sub-sequence combinations may be used. In this embodiment of the present disclosure, pilot overheads of the first pilot sequence are in direct proportion to N, and pilot overheads of the second pilot sequence are in direct proportion to D. When D is relatively large, the pilot overheads of the first pilot sequence increase relatively fast, and $N<S^D$ may occur. In this case, N sub-sequences in one-to-one correspondence with the first pilot sequence may be selected from SD possible sub-sequence combinations. For example, when N=144, S=12, and D=3, a second pilot sequence ($c_{i,1}, c_{i,2}, c_{i,3}$) formed by combining cyclic shift values $c_{i,1}, c_{i,2}$, and $c_{i,3}$ may be constructed, where $c_{i,1}=\mod(i, 12)$; $c_{i,2}=[i/12]$; $c_{i,3}=\mod(c_{i,1}+c_{i,2}, 12)$.

It should be pointed out that the foregoing design solution of the second pilot sequence is dedicated for a grant free transmission system, and there may be some collisions between different sub-sequences (DMRS). This design solution needs to be used together with the foregoing solution of the first pilot sequence, and is not suitable to replace an existing DMRS solution in a current system. A rule of using an ADRS and a DMRS together is described in the following by using an example. It is assumed that a DMRS occupies two OFDM symbols, 144 different DMRSs are supported, and there is the following correspondence between a pilot number n and a cyclic shift value combination ($c_{i,1}$, $c_{i,2}$): $n=12c_{i,1}+c_{i,2}$. It may be verified that cyclic shift value combinations corresponding to two terminal devices whose pilot numbers are 1 and 2 are respectively (0, 1) and (0, 2). If pilots corresponding to the cyclic shift value combinations are separately detected when statuses of the terminal devices are unknown, an obtained result is not a correct channel estimation result. First, it is determined, by using an ADRS, that the terminal devices whose pilot numbers are 1 and 2 are active, and further it is determined, according to the corresponding cyclic shift value combinations, that the two terminal devices collide on the first OFDM symbol and can be distinguished on the second OFDM symbol. Therefore, only a DMRS on the second OFDM symbol can be used for channel estimation. There are a large quantity of potential users in a grant free system, but at the same time, there are a small quantity of active terminal devices. Therefore, a probability that multiple DMRSs completely collide with each other is small, and this solution can be well applied to the grant free system. Another advantage of this solution is: Detection complexity of the ADRS is far lower than that of the DMRS. Because a user status is preliminarily determined by using the ADRS in this solution, a quantity of times of DMRS detection is reduced, and entire detection complexity is thereby reduced.

It should be understood that, in this embodiment of the present disclosure, DMRSs may be mapped to multiple second OFDM symbols for sending. Different DMRSs may be mapped to a same pilot sequence on a same second OFDM symbol, but DMRSs mapped to different second OFDM symbols are not completely the same.

In this embodiment of the present disclosure, it is assumed that for one CTU access region, 144 different second pilot sequences are configured in total, each second pilot sequence includes D sub-sequences, sub-sequences forming the second pilot sequence are, for example, DMRSs, that is, $N_{DMRS}=144$, and a quantity of subcarriers of each OFDM symbol is K. Each sub-sequence may be determined by using different cyclic shift values $c_i$ of a base sequence $b(k)$, as shown in the following formula (6):

$$r(k)=b(k)e^{(-jkc_i)}, k=1,\ldots,K \quad (6).$$

When D=3, a cyclic shift value $c_{i,d}$ of each sub-sequence forming an $i^{th}$ second pilot sequence may be, for example, determined according to the following formula (7):

$$c_{i,1}=\mathrm{mod}(i,12); c_{i,2}=[i/12]; c_{i,3}=\mathrm{mod}(c_{i,1}+c_{i,2},12) \quad (7).$$

When D=2, a cyclic shift value $c_{i,d}$ of each sub-sequence forming an $i^{th}$ second pilot sequence may be, for example, determined according to the following formula (8):

$$c_{i,1}=\mathrm{mod}(i,k); c_{i,2}=[i/k]; k=6,8, \mathrm{or}\, 12 \quad (8).$$

When D=3, a cyclic shift value $c_{i,d}$ of each sub-sequence forming an $i^{th}$ second pilot sequence may be, for example, determined according to the following formula (9) or (10):

$$c_{i,1}=\mathrm{mod}(i,k); c_{i,2}=[i/k]; c_{i,3}=\mathrm{mod}(c_{i,1}+c_{i,2},k); k=6,8, \mathrm{or}\,12 \quad (9),$$

$$c_{i,1}=\mathrm{mod}(i,k); c_{i,2}=[i/k^2]; c_{i,3}=[\mathrm{mod}(i,k^2)/k]; k=6,8, \mathrm{or}\, 12 \quad (10).$$

When D=4, a cyclic shift value $c_{i,d}$ of each sub-sequence forming an $i^{th}$ second pilot sequence may be, for example, determined according to the following formula (11) or (12):

$$c_{i,1}=\mathrm{mod}(i,k); c_{i,2}=[i/k^2]; c_{i,3}=[\mathrm{mod}(i,k^2)/k]; c_{i,4}=\mathrm{mod}(c_{i,1}+c_{i,2}+c_{i,3},k); k=6,8, \mathrm{or}\, 12 \quad (11),$$

$$c_{i,1}=\mathrm{mod}(i,k); c_{i,2}=[i/k^3]; c_{i,3}=[\mathrm{mod}(i,k^3)/k^2]; c_{i,4}=[\mathrm{mod}(i,k^2)]k; k=6,8, \mathrm{or}\, 12 \quad (12).$$

It should be understood that a cyclic shift value $c_{i,d}$ of each sub-sequence may be, for example, determined according to the foregoing formula, or may be determined according to a table.

For example, when D=2, a cyclic shift value $c_{i,d}$ of each sub-sequence forming an $i^{th}$ second pilot sequence may be, for example, shown in Table 4. When D=3, a cyclic shift value $c_{i,d}$ of each sub-sequence forming an $i^{th}$ second pilot sequence may be, for example, shown in Table 5.

TABLE 4

(D = 2)

| i | Cyclic shift value ($c_{i,1}$, $c_{i,2}$) |
|---|---|
| 1 | (0, 0) |
| 2 | (0, 1) |
| 3 | (0, 2) |

TABLE 5

(D = 3)

| i | Cyclic shift value ($c_{i,1}$, $c_{i,2}$, $c_{i,3}$) |
|---|---|
| 1 | (0, 0, 0) |
| 2 | (0, 1, 1) |
| 3 | (0, 2, 2) |

It should be understood that this embodiment of the present disclosure is described merely by using Table 4 and Table 5 as an example, but the present disclosure is not limited thereto. A cyclic shift value of each sub-sequence of the second pilot sequence may be determined according to another correspondence table, for example, a correspondence table of a first pilot number and a cyclic shift value, or a correspondence table of a first pilot sequence and a cyclic shift value.

In S250, the terminal device sends the first pilot sequence and the second pilot sequence by using the first OFDM symbol and the second OFDM symbol.

It should be understood that, in this embodiment of the present disclosure, the terminal device may generate data according to a pre-determined modulation and coding scheme, and send the first pilot sequence, the second pilot sequence, and the data on the grant free transmission resource. It should be further understood that, in this embodiment of the present disclosure, optionally, the terminal device sends the first pilot sequence and the second pilot sequence to the network device by using the first OFDM symbol and the second OFDM symbol.

In this embodiment of the present disclosure, optionally, the determining a first pilot sequence used to indicate whether the terminal device is in an active state includes:

selecting the first pilot sequence from a first pilot sequence set.

In this embodiment of the present disclosure, optionally, the determining a second pilot sequence used for uplink data demodulation includes:

selecting the second pilot sequence from a second pilot sequence set.

In this embodiment of the present disclosure, optionally, the grant free transmission resource is a transmission resource combining time and frequency, or a transmission resource combining time, frequency, and code domains, or another transmission resource in the foregoing description of the grant free transmission resource.

In this embodiment of the present disclosure, optionally, the method is applied to device-to-device D2D communication, machine to machine M2M communication, or machine type communication.

In this embodiment of the present disclosure, optionally, the network device is a base station and the terminal device is user equipment.

It should be understood that sequence numbers of the foregoing processes do not mean execution sequences in various embodiments of the present disclosure. Execution sequences of the processes need to be determined according to functions and internal logic of the processes, and should not be construed as any limitation to implementation processes of the embodiments of the present disclosure.

Therefore, in the pilot sequence transmission method in this embodiment of the present disclosure, a terminal device determines a first pilot sequence used to indicate whether the terminal device is in an active state and determines a second pilot sequence used for uplink data demodulation, respectively maps the first pilot sequence and the second pilot sequence to a first OFDM symbol and a second OFDM symbol of a grant free transmission resource, and sends the first pilot sequence and the second pilot sequence by using the first OFDM symbol and the second OFDM symbol. Therefore, a network device can determine activeness of the terminal device by detecting the first pilot sequence, and can detect only a second pilot sequence of a terminal device that is in an active state, and does not need to detect all possible second pilot sequences, so that a quantity of detected pilots can be significantly reduced, and pilot detection complexity is reduced.

In another aspect, in the pilot sequence transmission method in this embodiment of the present disclosure, the second pilot sequence is set to a sub-sequence combination including multiple sub-sequences. For a same quantity of second OFDM symbols, a quantity of second pilot sequences supported by the second OFDM symbols can be significantly increased. Therefore, a pilot collision probability can be significantly reduced, correctness of uplink data demodulation is increased, and a case in which excessive second OFDM symbols are occupied can be avoided, so that pilot overheads can be significantly reduced, and more time-frequency resources can be used for data transmission, that is, a data transmission amount of a system can be significantly increased.

The pilot sequence transmission method in the embodiment of the present disclosure is described above from a perspective of a terminal device with reference to FIG. 1 to FIG. 5F. In the following, the pilot sequence transmission method in the embodiment of the present disclosure is described from a perspective of a network device with reference to FIG. 6.

Figure 6:
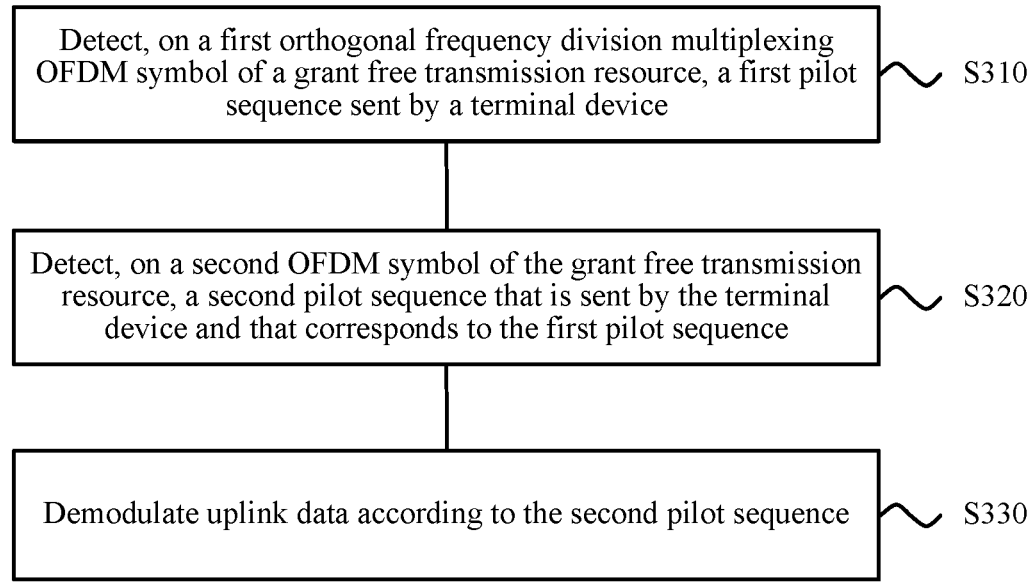
FIG. 6 is a schematic block diagram of a pilot sequence transmission method according to another embodiment of the present disclosure.

As shown in FIG. 6, a pilot sequence transmission method 300 according to an embodiment of the present disclosure, for example, may be performed by a network device in a grant free transmission system. The network device is, for example, a base station. The method 300 includes the following steps.

S310: Detect, on a first orthogonal frequency division multiplexing OFDM symbol of a grant free transmission resource, a first pilot sequence sent by a terminal device, where the first pilot sequence is used to indicate whether the terminal device is in an active state.

S320: Detect, on a second OFDM symbol of the grant free transmission resource, a second pilot sequence that is sent by the terminal device and that corresponds to the first pilot sequence, where the second pilot sequence is used for uplink data demodulation.

S330: Demodulate uplink data according to the second pilot sequence.

Specifically, in the grant free transmission system, there are a large quantity of terminal devices, but at the same time, there are an extremely small quantity of terminal devices that access a network, that is, an extremely small quantity of terminal devices are in an active state. Because the terminal device may randomly select a grant free transmission resource to send data, a network device does not know in advance which terminal devices are terminal devices that are in an active state. Therefore, the network device needs to detect every possible pilot, to determine a terminal device that is in an active state. Complexity of this detection process is extremely high.

To reduce pilot detection complexity of the network device, in a grant free access process of the terminal device, the terminal device may select the grant free transmission resource. For example, the terminal device may select a CTU access region. To transmit uplink data, the terminal device may determine the first pilot sequence and the second pilot sequence. The first pilot sequence is used to indicate a status of the terminal device, for example, used to indicate whether the terminal device is in an active state. The second pilot sequence is used for channel estimation, so as to be used for uplink data demodulation. Further, the terminal device may respectively map the first pilot sequence and the second pilot sequence to the first OFDM symbol and the second OFDM symbol of the grant free transmission resource, and send the first pilot sequence and the second pilot sequence by using the first OFDM symbol and the second OFDM symbol.

Correspondingly, the network device may detect the first pilot sequence on the first OFDM symbol of the grant free transmission resource. When the network device detects the first pilot sequence, the network device may determine that the terminal device sending the first pilot sequence is in an active state, so that the network device may detect, on the second OFDM symbol, only the second pilot sequence corresponding to the first pilot sequence. That is, the network device may detect only the second pilot sequence of the terminal device that is in an active state, perform channel estimation according to the second pilot sequence, and thereby demodulate uplink data, and the network device does not need to detect all possible second pilot sequences, so that a quantity of detected pilots can be significantly reduced, and pilot detection complexity is reduced.

Therefore, in the pilot sequence transmission method in this embodiment of the present disclosure, a network device detects, on a first OFDM symbol of a grant free transmission resource, a first pilot sequence sent by a terminal device, to determine, according to the first pilot sequence, whether the terminal device is in an active state; detects, on a second OFDM symbol of the grant free transmission resource, only a second pilot sequence corresponding to the detected first pilot sequence, that is, detects only the second pilot sequence of the terminal device that is in an active state; and demodulates uplink data according to the second pilot sequence. Therefore, the network device does not need to detect all possible second pilot sequences, so that a quantity of detected pilots can be significantly reduced, and pilot detection complexity is reduced.

It should be understood that, in this embodiment of the present disclosure, the first pilot sequence is used to indicate the status of the terminal device, for example, used to indicate whether the terminal device is in an active state. The first pilot sequence may be a Walsh code, or may be another pilot sequence used by the network device to determine activeness or an active state of the terminal device. For example, the first pilot sequence is a Zadoff-Chu (ZC) sequence. For another example, the first pilot sequence is an activity detection reference signal (ADRS), but this embodiment of the present disclosure is not limited thereto.

It should be further understood that, in this embodiment of the present disclosure, the second pilot sequence is used for uplink data demodulation. Specifically, it may be understood that the second pilot sequence may be used by the network device for channel estimation, and the network device further demodulates, according to a channel estimation result, uplink data sent by the terminal device. The second pilot sequence is, for example, a DMRS. Certainly, the second pilot sequence may be another pilot sequence used by the network device for uplink data demodulation, and this embodiment of the present disclosure is not limited thereto.

It should be further understood that, in this embodiment of the present disclosure, the grant free transmission resource may represent a time-frequency resource used to transmit uplink data in uplink grant free transmission. For example, the grant free transmission resource is a CTU access region. It should be further understood that this embodiment of the present disclosure is described merely by using a CTU access region as an example, but the present disclosure is not limited thereto.

In this embodiment of the present disclosure, the network device may detect the first pilot sequence on the first OFDM symbol of the grant free transmission resource, to determine activeness of the terminal device, for example, determine whether the corresponding terminal device is in an active state. When the network device detects the first pilot sequence, the network device may determine that the terminal device sending the first pilot sequence is in an active state, so that the network device may determine a first pilot number of the terminal device that is in an active state, or determine a first pilot number corresponding to the first pilot sequence. Further, the network device may determine, according to the determined first pilot number, the second pilot sequence corresponding to the first pilot number, and detect, on the second OFDM symbol, only the second pilot sequence corresponding to the first pilot number. That is, the network device may detect only the second pilot sequence of the terminal device that is in an active state, and may perform channel estimation according to the second pilot sequence, to demodulate uplink data according to a channel estimation result, and the network device does not need to detect all possible second pilot sequences, so that a quantity of detected pilots can be significantly reduced, and pilot detection complexity is reduced.

It should be understood that, in this embodiment of the present disclosure, the network device may determine, based on whether the first pilot sequence is received or detected, whether the corresponding terminal device is in an active state. For example, the network device may determine, according to received signal strength, whether the first pilot sequence is detected, to further determine whether the corresponding terminal device is in an active state. For example, it is assumed that the first pilot sequence selected by the terminal device is Wi, a corresponding channel is Hi, and a status variant Ii is set. A value of the status variant is 1 or 0 to indicate whether the terminal device is active. Then, a received signal Y may be represented as:

$$Y = \Sigma_i I_i \, H_i \, W_i,$$

where "·" represents a dot product of vectors. A correlation operation is performed on the signal Y, to obtain a parameter Ai used to determine whether the terminal device is active:

$$Ai = |Y^H W_i|^2$$

If the parameter Ai is greater than a predetermined threshold T, the network device may determine that the corresponding terminal device is in an active state, or if the parameter Ai is not greater than the predetermined threshold T, the network device may determine that the corresponding terminal device is in a non-active state, so that the network device may determine, by detecting all first pilot sequences, the terminal device that is in an active state. Therefore, the network device may detect only the second pilot sequence of the terminal device that is in an active state, so that a quantity of detected pilots can be significantly reduced, and pilot detection complexity is reduced.

It should be understood that this embodiment of the present disclosure is described merely by using the first pilot number as an example, but the present disclosure is not limited thereto. For example, the network device may directly determine, according to a correspondence between the first pilot sequence and the second pilot sequence, a second pilot sequence that needs to be detected. The correspondence is described in detail in the following. For brevity, details are not described herein.

In this embodiment of the present disclosure, optionally, the detecting, on a first orthogonal frequency division multiplexing OFDM symbol of a grant free transmission resource, a first pilot sequence sent by a terminal device includes:

detecting the first pilot sequence in a part of a subband of the first OFDM symbol of the grant free transmission resource.

Specifically, it should be understood that, in this embodiment of the present disclosure, the first OFDM symbol is an OFDM symbol used to transmit the first pilot sequence in the grant free transmission resource. Therefore, the first OFDM symbol may also be referred to as a first pilot symbol. One grant free transmission resource may include one or more first OFDM symbols. For example, in this embodiment of the present disclosure, the grant free transmission resource is, for example, a CTU access region. A first OFDM symbol in one CTU access region may include two OFDM symbols. Further, the first OFDM symbol in the CTU access region may include the third OFDM symbol and the tenth OFDM symbol of the CTU access region. It should be further understood that, in this embodiment of the present disclosure, first OFDM symbols of grant free transmission resources may include a same quantity of OFDM symbols or different quantities of OFDM symbols.

It should be further understood that this embodiment of the present disclosure is described merely by using this as an example, but the present disclosure is not limited thereto. For example, a first OFDM symbol in one CTU access region may include only one OFDM symbol, or a first OFDM symbol in one CTU access region may include three or more OFDM symbols.

For example, as shown in FIG. 4A, the terminal device may map the first pilot sequence to a part of a subband of the third OFDM symbol, and the first pilot sequence does not occupy entire transmission bandwidth of the OFDM symbol, so that pilot overheads can be significantly reduced. Correspondingly, the network device needs to detect the first pilot sequence on the part of the subband of the third OFDM symbol of the grant free transmission resource.

It should be understood that this embodiment of the present disclosure is described merely by using an example in which the first pilot sequence is mapped to four REs, but the present disclosure is not limited thereto. For example, the first pilot sequence may be mapped to two REs or eight REs. It should be further understood that this embodiment of the present disclosure is described merely by using an example in which the first pilot sequence is mapped to a part of a subband of one OFDM symbol, but the present disclosure is not limited thereto. For example, the first pilot sequence may be mapped to parts of subbands of two or more OFDM symbols.

In this embodiment of the present disclosure, optionally, an element of the first pilot sequence is a non-zero element. In this embodiment of the present disclosure, because the first pilot sequence is used to indicate activeness of the terminal device, the first pilot sequence may be designed to have a relatively short length. Therefore, the non-zero element may be mapped to a part of a subband of the grant free transmission resource. That is, the terminal device may send the first pilot sequence on a part of a frequency resource of an OFDM symbol, and does not need to send the first pilot sequence over entire transmission bandwidth of the OFDM symbol. Therefore, in one aspect, pilot overheads can be significantly reduced, and in another aspect, a relatively short first pilot sequence facilitates detection performed by the network device, so that pilot detection complexity can be further reduced.

In another aspect, in this embodiment of the present disclosure, optionally, the first pilot sequence includes a first pilot sub-sequence and a second pilot sub-sequence. Each element of the first pilot sub-sequence is a zero element, and an element of the second pilot sub-sequence is a non-zero element. The first pilot sequence may be mapped to a part of a subband of the grant free transmission resource, so that pilot overheads can be significantly reduced. Although compared with the first pilot sequence in the previous embodiment, the first pilot sequence in this embodiment has a larger length, each element of the first pilot sub-sequence is a zero element, and the first pilot sequence may be mapped into a zero symbol on the grant free transmission resource. Therefore, pilot detection complexity can also be reduced. It should be understood that, in this embodiment of the present disclosure, the first pilot sub-sequence including only a zero element is mapped into a zero symbol, and the second pilot sub-sequence including a non-zero element is mapped into a non-zero symbol.

In this embodiment of the present disclosure, optionally, the detecting, on a first orthogonal frequency division multiplexing OFDM symbol of a grant free transmission resource, a first pilot sequence sent by a terminal device includes:

detecting the first pilot sequence in a first subband of the first OFDM symbol of the grant free transmission resource, where the first subband includes M resource elements REs, a non-zero symbol formed after the non-zero element is mapped is an M-order Walsh code, and M is a positive integer and is an exponential power of 2.

That is, the non-zero element included in the first pilot sequence is mapped to the M resource elements REs of the grant free transmission resource, the non-zero symbol formed after the non-zero element is mapped is an M-order Walsh code, and M is a positive integer and is an exponential power of 2. Optionally, the M REs are M consecutive REs, so that orthogonality between pilot sequences can be further enhanced.

It should be understood that this embodiment of the present disclosure is described merely by using the Walsh code as an example, but the present disclosure is not limited thereto. For example, the first pilot sequence may be a pseudo-noise sequence that is also referred to as a PN sequence, or the first pilot sequence may be a Zadoff-Chu (ZC) sequence or an M sequence.

It should be further understood that, in this embodiment of the present disclosure, if the first pilot sequence is a Zadoff-Chu sequence, terminal devices mapped to a same subband may be distinguished by using cyclic shift values and root numbers. If the first pilot sequence is an M sequence, terminal devices mapped to a same subband may be distinguished by using cyclic shift values, that is, first pilot sequences of the terminal devices mapped to the same subband correspond to different cyclic shift values.

Optionally, in this embodiment of the present disclosure, the REs included in the first subband are M consecutive REs. That is, in this embodiment of the present disclosure, the first pilot sequence is preferably mapped to consecutive REs of a subband, so that better orthogonality between different first pilot sequences is achieved, and pilot detection reliability of a system can be further improved.

In this embodiment of the present disclosure, the network device may determine the second pilot sequence according to a correspondence between the first pilot sequence and the second pilot sequence. The correspondence may have multiple representation forms, for example, a formula or a table. That is, the network device may determine the second pilot sequence by performing an operation according to a formula, or may determine, by means of table searching, the second pilot sequence corresponding to the first pilot sequence. It should be understood that this embodiment of the present disclosure is described merely by using this as an example, but the present disclosure is not limited thereto.

In this embodiment of the present disclosure, optionally, when the correspondence between the first pilot sequence and the second pilot sequence is established by using the first pilot number, that the network device detects, on a second OFDM symbol of the grant free transmission resource, a second pilot sequence that is sent by the terminal device and that corresponds to the first pilot sequence may include: determining, by the network device, the first pilot number according to the detected first pilot sequence; determining, by the network device, the second pilot sequence according to the first pilot number; and detecting, by the network device, the second pilot sequence on the second OFDM symbol.

Specifically, in this embodiment of the present disclosure, the network device may determine the first pilot number according to the detected first pilot sequence. Further, the network device may determine the second pilot sequence according to a correspondence between the first pilot number and the second pilot sequence. Therefore, the network device may separately detect, on the second OFDM symbol, one or more second pilot sequences corresponding to one or more first pilot sequences. Optionally, the correspondence may have multiple representation forms, for example, a formula or a table. That is, the network device may determine the second pilot sequence by performing an operation according to a formula, or may determine, by means of table searching, the second pilot sequence corresponding to the first pilot number. It should be understood that this embodiment of the present disclosure is described merely by using this as an example, but the present disclosure is not limited thereto. For example, in this embodiment of the present disclosure, the network device may determine the second pilot sequence corresponding to the first pilot number from a second pilot sequence set.

In this embodiment of the present disclosure, the first pilot sequence is used to indicate a status of the terminal device, and the second pilot sequence is used for uplink data demodulation. There may be a correspondence between the first pilot sequence and the second pilot sequence. Therefore, the network device may detect, by detecting the first pilot sequence, only the second pilot sequence corresponding to the first pilot sequence, and does not need to detect all possible second pilot sequences, so that a quantity of detected pilots can be significantly reduced, and pilot detection complexity is reduced. The correspondence between the first pilot sequence and the second pilot sequence may be a one-to-multiple correspondence, a multiple-to-one correspondence, or a one-to-one correspondence.

Specifically, in a first aspect, in this embodiment of the present disclosure, one first pilot sequence may correspond to multiple second pilot sequences, or one first pilot sequence may correspond to a group of second pilot sequences. The group of second pilot sequences may include two or more second pilot sequences. That is, the correspondence between the first pilot sequence and the second pilot sequence may be a one-to-multiple correspondence. Therefore, a quantity of first pilot sequences may be less than a quantity of second pilot sequences, so that overheads of the first pilot sequence can be reduced. However, it should be understood that, in this case, compared with a case in which there is a one-to-one correspondence between the first pilot sequence and the second pilot sequence, accuracy of detecting the first pilot sequence by the network device may be decreased, and at the same time, complexity of detecting the second pilot sequence by the network device may be increased.

Further, the terminal device may first determine the first pilot number, and determine the first pilot sequence and the second pilot sequence according to the first pilot number. One first pilot sequence may correspond to multiple second pilot sequences. For example, one pilot number may correspond to one first pilot sequence, and may correspond to multiple second pilot sequences; or multiple pilot numbers may respectively correspond to multiple second pilot sequences but all correspond to one first pilot sequence, that is, different pilot numbers may correspond to a same first pilot sequence but correspond to different second pilot sequences. Correspondingly, the network device may first detect the first pilot sequence on the first OFDM symbol. When the network device detects the first pilot sequence, the network device may determine that the terminal device sending the first pilot sequence is in an active state. Therefore, the network device may separately detect the multiple second pilot sequences corresponding to the first pilot sequence. Because the network device needs to separately detect only the multiple second pilot sequences corresponding to the first pilot sequence, and does not need to detect all possible second pilot sequences, a quantity of detected pilots can be significantly reduced, and pilot detection complexity is reduced.

In a second aspect, in this embodiment of the present disclosure, multiple first pilot sequences may correspond to one second pilot sequence, or a group of first pilot sequences may correspond to one second pilot sequence. The group of first pilot sequences may include two or more first pilot sequences. That is, the correspondence between the first pilot sequence and the second pilot sequence may be a multiple-to-one correspondence.

For example, the terminal device may first determine the first pilot number, and determine the first pilot sequence and the second pilot sequence according to the first pilot number. Multiple first pilot sequences may correspond to one second pilot sequence. For example, one pilot number may correspond to multiple first pilot sequences, and may correspond to one second pilot sequence; or multiple pilot numbers may respectively correspond to multiple first pilot sequences but all correspond to one second pilot sequence, that is, a same pilot number may correspond to different first pilot sequences but correspond to a same second pilot sequence. Correspondingly, the network device may first detect the first pilot sequence on the first OFDM symbol. When the network device detects the first pilot sequence, the network device may determine that the terminal device sending the first pilot sequence is in an active state. Therefore, the network device may detect the second pilot sequence corresponding to the first pilot sequences. Because the network device needs to detect only the second pilot sequence corresponding to the first pilot sequences, and does not need to detect all possible second pilot sequences, a quantity of detected pilots can be significantly reduced, and pilot detection complexity is reduced.

In a third aspect, in this embodiment of the present disclosure, preferably, the first pilot sequence is in one-to-one correspondence with the second pilot sequence. For example, one pilot number may uniquely correspond to one first pilot sequence, and may uniquely correspond to one second pilot sequence. It should be understood that this embodiment of the present disclosure is described merely by using this as an example, but the present disclosure is not limited thereto. For example, multiple pilot numbers may correspond to one first pilot sequence, and the first pilot sequence may uniquely correspond to one second pilot sequence; or multiple pilot numbers may correspond to one second pilot sequence, and the second pilot sequence may uniquely correspond to one first pilot sequence.

In this embodiment of the present disclosure, optionally, the second pilot sequence is a sub-sequence combination including multiple sub-sequences. That is, in this embodiment of the present disclosure, there may be a one-to-multiple correspondence, a multiple-to-one correspondence, or a one-to-one correspondence between the first pilot sequence and the sub-sequence combination including two or more sub-sequences. The sub-sequence is, for example, a DMRS.

For example, if each OFDM symbol can support a maximum of S orthogonal pilot sequences, and the pilot sequences supported by each OFDM symbol are used as one element in the sub-sequence combination, that is, pilot sequences carried on each OFDM symbol are used as one sub-sequence in the sub-sequence combination, for D OFDM symbols, a maximum of SD different sub-sequence combinations may be formed, so that a quantity of available second pilot sequences in the system can be significantly increased. For example, according to parameter configuration of an existing system, each OFDM symbol can support S=12 orthogonal pilot sequences, and two OFDM symbols can support a maximum of $12^2=144$ different sub-sequence combinations, that is, 144 different second pilot sequences.

It should be further understood that this embodiment of the present disclosure is described merely by using an example in which a sub-sequence combination including multiple sub-sequences is used to increase a quantity of second pilot sequences, but the present disclosure is not limited thereto. For example, a method of increasing a quantity of pilot sequences supported by each second OFDM symbol may be used to satisfy a requirement of a sufficiently low pilot collision probability.

Therefore, in this embodiment of the present disclosure, multiple sub-sequences are combined to form the second pilot sequence, so that sufficient pilot sequences that may be distinguished from each other can be formed, and not only the requirement of a sufficiently low pilot collision probability can be satisfied, but pilot overheads can also be significantly reduced.

In this embodiment of the present disclosure, optionally, at least two of the multiple sub-sequences included in the second pilot sequence are sub-sequences mapped to a same second OFDM symbol of the grant free transmission resource.

In this embodiment of the present disclosure, optionally, all the multiple sub-sequences included in the second pilot sequence are sub-sequences mapped to a same second OFDM symbol of the grant free transmission resource.

In this embodiment of the present disclosure, optionally, at least two of the multiple sub-sequences included in the second pilot sequence are sub-sequences separately mapped to different subbands of a same second OFDM symbol of the grant free transmission resource.

In this embodiment of the present disclosure, optionally, all the multiple sub-sequences included in the second pilot sequence are sub-sequences separately mapped to different second OFDM symbols of the grant free transmission resource.

In this embodiment of the present disclosure, optionally, all the multiple sub-sequences included in the second pilot sequence are sub-sequences separately mapped to entire frequency bands of the different second OFDM symbols of the grant free transmission resource, and the second OFDM symbols are different from the first OFDM symbol.

In this embodiment of the present disclosure, optionally, the second pilot sequence is represented by multiple cyclic shift values, and the multiple cyclic shift values are in one-to-one correspondence with the multiple sub-sequences.

In this embodiment of the present disclosure, optionally, the grant free transmission resource is a transmission resource combining time and frequency, or a transmission resource combining time, frequency, and code domains.

In this embodiment of the present disclosure, optionally, the method is applied to device-to-device D2D communication, machine to machine M2M communication, or machine type communication.

In this embodiment of the present disclosure, optionally, the network device is a base station and the terminal device is user equipment.

It should be understood that, in this embodiment of the present disclosure, detection reliability can be significantly improved by means of time domain diversity or frequency domain diversity, but pilot overheads are increased at the same time. In addition, in this embodiment of the present disclosure, detection reliability may be improved by means of spatial diversity. For example, a quantity of receive antennas of the base station may be increased, so that the base station can separately detect signals received by using multiple receive antennas, and therefore, detection reliability can be improved without increasing pilot overheads. However, it should be understood that, in this embodiment of the present disclosure, a quantity of transmit antennas of the terminal device may be increased. That is, the terminal device respectively sends different first pilot sequences on different antennas. It may be considered that a corresponding terminal device is in an active state provided that the base station detects one of the first pilot sequences. In this manner, detection reliability can also be improved, but pilot overheads need to be increased.

It should be further understood that, in this embodiment of the present disclosure, different second pilot sequences may be distinguished in at least one of the following three manners: a time domain (an OFDM symbol), a frequency domain (a subcarrier group or a subband), or a code domain. For example, the second pilot sequences may be mapped to different OFDM symbols, to distinguish the second pilot sequences. Similarly, the second pilot sequences may be mapped to different subbands of an OFDM symbol, to distinguish the second pilot sequences. Further, if multiple second pilot sequences are mapped to a same time-frequency resource, different second pilot sequences mapped to the same time-frequency resource need to be orthogonal to each other. In addition, it should be further understood that, in this embodiment of the present disclosure, sub-sequences mapped to second OFDM symbols are not completely the same, so that the network device can perform correct channel estimation, to demodulate uplink data.

Therefore, in this embodiment of the present disclosure, optionally, the detecting, on a first orthogonal frequency division multiplexing OFDM symbol of a grant free transmission resource, a first pilot sequence sent by a terminal device includes: detecting, on different first OFDM symbols of the grant free transmission resource, the first pilot sequence repeatedly mapped by the terminal device; and/or detecting, in different subbands of the first OFDM symbol of the grant free transmission resource, the first pilot sequence repeatedly mapped by the terminal device.

Similarly, in this embodiment of the present disclosure, optionally, the detecting, on a second OFDM symbol of the grant free transmission resource, a second pilot sequence that is sent by the terminal device and that corresponds to the first pilot sequence includes: detecting, on different second OFDM symbols of the grant free transmission resource, the second pilot sequence repeatedly mapped by the terminal device; and/or detecting, in different subbands of the second OFDM symbol of the grant free transmission resource, the second pilot sequence repeatedly mapped by the terminal device.

It should be understood that sequence numbers of the foregoing processes do not mean execution sequences in various embodiments of the present disclosure. Execution sequences of the processes need to be determined according to functions and internal logic of the processes, and should not be construed as any limitation to implementation processes of the embodiments of the present disclosure.

Therefore, in the pilot sequence transmission method in this embodiment of the present disclosure, a network device detects, on a first OFDM symbol of a grant free transmission resource, a first pilot sequence sent by a terminal device, to determine, according to the first pilot sequence, whether the terminal device is in an active state; detects, on a second OFDM symbol of the grant free transmission resource, only a second pilot sequence corresponding to the detected first pilot sequence, that is, detects only the second pilot sequence of the terminal device that is in an active state; and demodulates uplink data according to the second pilot sequence. Therefore, the network device does not need to detect all possible second pilot sequences, so that a quantity of detected pilots can be significantly reduced, and pilot detection complexity is reduced.

In another aspect, in the pilot sequence transmission method in this embodiment of the present disclosure, the second pilot sequence is set to a sub-sequence combination including multiple sub-sequences. For a same quantity of second OFDM symbols, a quantity of second pilot sequences supported by the second OFDM symbol can be significantly increased. Therefore, a pilot collision probability can be significantly reduced, correctness of uplink data demodulation is increased, and a case in which excessive second OFDM symbols are occupied can be avoided, so that pilot overheads can be significantly reduced, and more time-frequency resources can be used for data transmission, that is, a data transmission amount of a system can be significantly increased.

The pilot sequence transmission method according to the embodiments of the present disclosure is described above in detail with reference to FIG. 1 to FIG. 6, and in the following, a pilot sequence transmission apparatus according to an embodiment of the present disclosure is described in detail with reference to FIG. 7 to FIG. 11.

Figure 7:
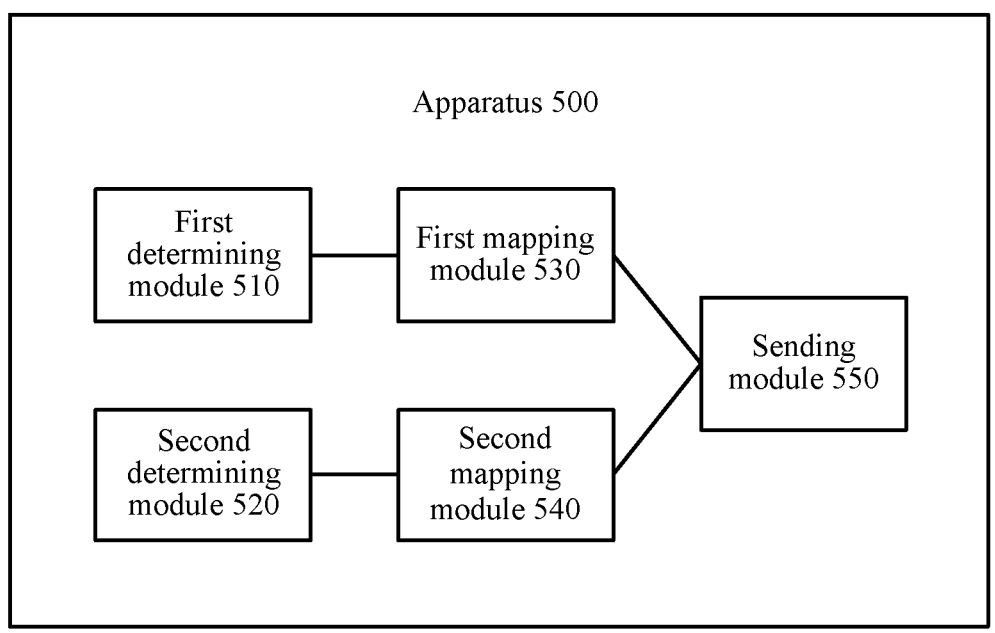
FIG. 7 is a schematic block diagram of a pilot sequence transmission apparatus according to an embodiment of the present disclosure.

FIG. 7 shows a pilot sequence transmission apparatus 500 according to an embodiment of the present disclosure. As shown in FIG. 7, the apparatus 500 includes:

a first determining module 510, configured to determine a first pilot sequence used to indicate whether a terminal device is in an active state;

a second determining module 520, configured to determine a second pilot sequence used for uplink data demodulation;

a first mapping module 530, configured to map the first pilot sequence determined by the first determining module 510 to a first orthogonal frequency division multiplexing OFDM symbol of a grant free transmission resource;

a second mapping module 540, configured to map the second pilot sequence determined by the second determining module 520 to a second OFDM symbol of the grant free transmission resource; and a sending module 550, configured to send the first pilot sequence and the second pilot sequence by using the first OFDM symbol mapped by the first mapping module 530 and the second OFDM symbol mapped by the second mapping module 540.

Therefore, in the pilot sequence transmission apparatus in this embodiment of the present disclosure, a terminal device determines a first pilot sequence used to indicate whether the terminal device is in an active state and determines a second pilot sequence used for uplink data demodulation, respectively maps the first pilot sequence and the second pilot sequence to a first OFDM symbol and a second OFDM symbol of a grant free transmission resource, and sends the first pilot sequence and the second pilot sequence by using the first OFDM symbol and the second OFDM symbol. Therefore, a network device can determine activeness of the terminal device by detecting the first pilot sequence, and can detect only a second pilot sequence of a terminal device that is in an active state, and does not need to detect all possible second pilot sequences, so that a quantity of detected pilots can be significantly reduced, and pilot detection complexity is reduced.

Figure 8:
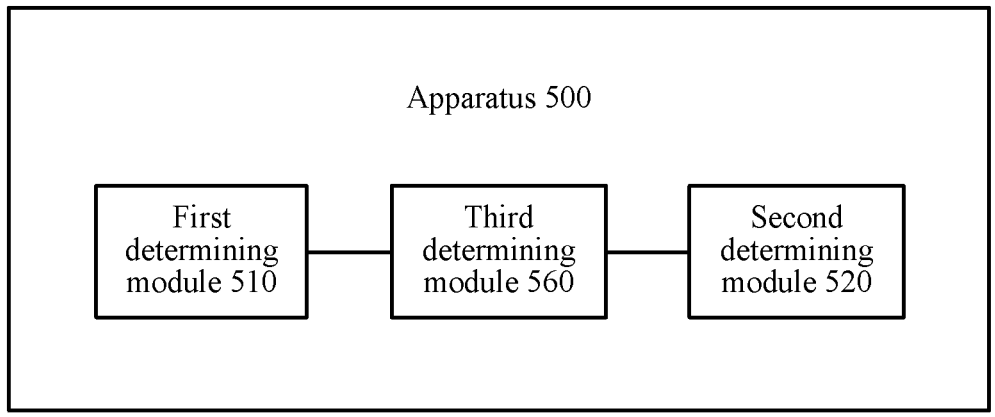
FIG. 8 is another schematic block diagram of a pilot sequence transmission apparatus according to an embodiment of the present disclosure.

In this embodiment of the present disclosure, as shown in FIG. 8, optionally, the apparatus 500 further includes a third determining module 560, configured to determine a first pilot number.

The first determining module 510 is specifically configured to determine the first pilot sequence according to the first pilot number; and the second determining module 520 is specifically configured to determine the second pilot sequence according to the first pilot number.

Therefore, in the pilot sequence transmission apparatus in this embodiment of the present disclosure, a terminal device determines a first pilot number, determines a first pilot sequence and a second pilot sequence according to the first pilot number, respectively maps the first pilot sequence and the second pilot sequence to a first OFDM symbol and a second OFDM symbol of a grant free transmission resource, and sends the first pilot sequence and the second pilot sequence by using the first OFDM symbol and the second OFDM symbol. Therefore, a network device can determine activeness of the terminal device by detecting the first pilot sequence, and can detect only the second pilot sequence corresponding to the first pilot sequence, and does not need to detect all possible second pilot sequences, so that a quantity of detected pilots can be significantly reduced, and pilot detection complexity is reduced.

In this embodiment of the present disclosure, optionally, the third determining module 560 is specifically configured to:

determine the first pilot number according to an identifier of the terminal device; or determine the first pilot number according to an identifier of the grant free transmission resource and an identifier of the terminal device; or generate the first pilot number by using a random number generator.

In this embodiment of the present disclosure, optionally, the first mapping module 530 is specifically configured to map the first pilot sequence to a part of a subband of the first OFDM symbol of the grant free transmission resource.

In this embodiment of the present disclosure, optionally, an element of the first pilot sequence is a non-zero element.

In this embodiment of the present disclosure, optionally, the first pilot sequence includes a first pilot sub-sequence and a second pilot sub-sequence. Each element of the first pilot sub-sequence is a zero element, and an element of the second pilot sub-sequence is a non-zero element.

In this embodiment of the present disclosure, optionally, the first mapping module 530 is specifically configured to map the non-zero element included in the first pilot sequence to a first subband of the first OFDM symbol of the grant free transmission resource. The first subband includes M resource elements REs, a non-zero symbol formed after the non-zero element is mapped is an M-order Walsh code, and M is a positive integer and is an exponential power of 2.

In this embodiment of the present disclosure, optionally, the REs included in the first subband are M consecutive REs.

In this embodiment of the present disclosure, optionally, the first mapping module 530 is specifically configured to:

repeatedly map the first pilot sequence to different first OFDM symbols of the grant free transmission resource; and/or repeatedly map the first pilot sequence to different subbands of the first OFDM symbol of the grant free transmission resource.

In this embodiment of the present disclosure, optionally, the first pilot sequence is in one-to-one correspondence with the second pilot sequence.

In this embodiment of the present disclosure, optionally, the second pilot sequence is a sub-sequence combination including multiple sub-sequences.

In this embodiment of the present disclosure, optionally, the second mapping module 540 is specifically configured to map at least two of the multiple sub-sequences included in the second pilot sequence to a same second OFDM symbol of the grant free transmission resource.

In this embodiment of the present disclosure, optionally, the second mapping module 540 is specifically configured to map all the multiple sub-sequences included in the second pilot sequence to a same second OFDM symbol of the grant free transmission resource.

In this embodiment of the present disclosure, optionally, the second mapping module 540 is specifically configured to separately map at least two of the multiple sub-sequences included in the second pilot sequence to different subbands of a same second OFDM symbol of the grant free transmission resource.

In this embodiment of the present disclosure, optionally, the second mapping module 540 is specifically configured to separately map all the multiple sub-sequences included in the second pilot sequence to different second OFDM symbols of the grant free transmission resource.

In this embodiment of the present disclosure, optionally, the second mapping module 540 is specifically configured to separately map all the multiple sub-sequences included in the second pilot sequence to entire frequency bands of the different second OFDM symbols of the grant free transmission resource. The second OFDM symbols are different from the first OFDM symbol.

In this embodiment of the present disclosure, optionally, the second pilot sequence is generated by using multiple cyclic shift values, and the multiple cyclic shift values are in one-to-one correspondence with the multiple sub-sequences.

In this embodiment of the present disclosure, optionally, the second mapping module 540 is specifically configured to repeatedly map the second pilot sequence to different second OFDM symbols of the grant free transmission resource.

In this embodiment of the present disclosure, optionally, the first determining module 510 is specifically configured to select the first pilot sequence from a first pilot sequence set.

In this embodiment of the present disclosure, optionally, the second determining module 520 is specifically configured to select the second pilot sequence from a second pilot sequence set.

In this embodiment of the present disclosure, optionally, the sending module 550 is configured to send the first pilot sequence and the second pilot sequence to a network device by using the first OFDM symbol mapped by the first mapping module 530 and the second OFDM symbol mapped by the second mapping module 540.

In this embodiment of the present disclosure, optionally, the grant free transmission resource is a transmission resource combining time and frequency, or a transmission resource combining time, frequency, and code domains.

In this embodiment of the present disclosure, optionally, the apparatus is applied to device-to-device D2D communication, machine to machine M2M communication, or machine type communication.

In this embodiment of the present disclosure, optionally, the network device is a base station, and the terminal device is user equipment.

In this embodiment of the present disclosure, optionally, the apparatus 500 is a terminal device.

It should be understood that the apparatus 500 in this embodiment of the present disclosure may correspond to the terminal device in the method embodiment of the present disclosure, and the foregoing and other operations and/or functions of the modules in the apparatus 500 are separately used to implement corresponding procedures of the method 200 shown in FIG. 1 to FIG. 5F. For brevity, descriptions of the method embodiment may be applicable to the apparatus embodiment, and details are not described herein again.

Therefore, in the pilot sequence transmission apparatus in this embodiment of the present disclosure, a terminal device determines a first pilot sequence used to indicate whether the terminal device is in an active state and determines a second pilot sequence used for uplink data demodulation, respectively maps the first pilot sequence and the second pilot sequence to a first OFDM symbol and a second OFDM symbol of a grant free transmission resource, and sends the first pilot sequence and the second pilot sequence by using the first OFDM symbol and the second OFDM symbol. Therefore, a network device can determine activeness of the terminal device by detecting the first pilot sequence, and can detect only a second pilot sequence of a terminal device that is in an active state, and does not need to detect all possible second pilot sequences, so that a quantity of detected pilots can be significantly reduced, and pilot detection complexity is reduced.

In another aspect, in the pilot sequence transmission apparatus in this embodiment of the present disclosure, the second pilot sequence is set to a sub-sequence combination including multiple sub-sequences. For a same quantity of second OFDM symbols, a quantity of second pilot sequences supported by the second OFDM symbols can be significantly increased. Therefore, a pilot collision probability can be significantly reduced, correctness of uplink data demodulation is increased, and a case in which excessive second OFDM symbols are occupied can be avoided, so that pilot overheads can be significantly reduced, and more time-frequency resources can be used for data transmission, that is, a data transmission amount of a system can be significantly increased.

Figure 9:
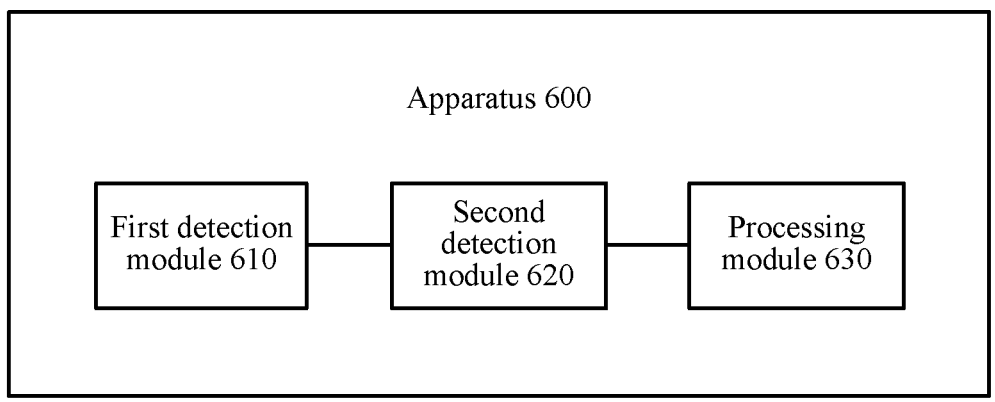
FIG. 9 is a schematic block diagram of a pilot sequence transmission apparatus according to another embodiment of the present disclosure.

FIG. 9 shows a pilot sequence transmission apparatus 600 according to another embodiment of the present disclosure. As shown in FIG. 9, the apparatus 600 includes:

a first detection module 610, configured to detect, on a first orthogonal frequency division multiplexing OFDM symbol of a grant free transmission resource, a first pilot sequence sent by a terminal device, where the first pilot sequence is used to indicate whether the terminal device is in an active state;

a second detection module 620, configured to detect, on a second OFDM symbol of the grant free transmission resource, a second pilot sequence that is sent by the terminal device and that corresponds to the first pilot sequence detected by the first detection module 610, where the second pilot sequence is used for uplink data demodulation; and a processing module 630, configured to demodulate uplink data according to the second pilot sequence detected by the second detection module 620.

Therefore, in the pilot sequence transmission apparatus in this embodiment of the present disclosure, a network device detects, on a first OFDM symbol of a grant free transmission resource, a first pilot sequence sent by a terminal device, to determine, according to the first pilot sequence, whether the terminal device is in an active state; detects, on a second OFDM symbol of the grant free transmission resource, only a second pilot sequence corresponding to the detected first pilot sequence, that is, detects only the second pilot sequence of the terminal device that is in an active state; and demodulates uplink data according to the second pilot sequence. Therefore, the network device does not need to detect all possible second pilot sequences, so that a quantity of detected pilots can be significantly reduced, and pilot detection complexity is reduced.

In this embodiment of the present disclosure, optionally, the first detection module 610 is specifically configured to detect the first pilot sequence in a part of a subband of the first OFDM symbol of the grant free transmission resource.

In this embodiment of the present disclosure, optionally, an element of the first pilot sequence is a non-zero element.

In this embodiment of the present disclosure, optionally, the first pilot sequence includes a first pilot sub-sequence and a second pilot sub-sequence. Each element of the first pilot sub-sequence is a zero element, and an element of the second pilot sub-sequence is a non-zero element.

In this embodiment of the present disclosure, optionally, the first detection module 610 is specifically configured to detect the first pilot sequence in a first subband of the first OFDM symbol of the grant free transmission resource. The first subband includes M resource elements REs, a non-zero symbol formed after the non-zero element is mapped is an M-order Walsh code, and M is a positive integer and is an exponential power of 2.

In this embodiment of the present disclosure, optionally, the REs included in the first subband are M consecutive REs.

In this embodiment of the present disclosure, optionally, the first pilot sequence is in one-to-one correspondence with the second pilot sequence.

In this embodiment of the present disclosure, optionally, the second pilot sequence is a sub-sequence combination including multiple sub-sequences.

In this embodiment of the present disclosure, optionally, at least two of the multiple sub-sequences included in the second pilot sequence are sub-sequences mapped to a same second OFDM symbol of the grant free transmission resource.

In this embodiment of the present disclosure, optionally, all the multiple sub-sequences included in the second pilot sequence are sub-sequences mapped to a same second OFDM symbol of the grant free transmission resource.

In this embodiment of the present disclosure, optionally, at least two of the multiple sub-sequences included in the second pilot sequence are sub-sequences separately mapped to different subbands of a same second OFDM symbol of the grant free transmission resource.

In this embodiment of the present disclosure, optionally, all the multiple sub-sequences included in the second pilot sequence are sub-sequences separately mapped to different second OFDM symbols of the grant free transmission resource.

In this embodiment of the present disclosure, optionally, the second pilot sequence is represented by multiple cyclic shift values, and the multiple cyclic shift values are in one-to-one correspondence with the multiple sub-sequences.

In this embodiment of the present disclosure, optionally, the grant free transmission resource is a transmission resource combining time and frequency, or a transmission resource combining time, frequency, and code domains.

In this embodiment of the present disclosure, optionally, the apparatus is applied to device-to-device D2D communication, machine to machine M2M communication, or machine type communication.

In this embodiment of the present disclosure, optionally, the network device is a base station and the terminal device is user equipment.

In this embodiment of the present disclosure, optionally, the apparatus 600 is a network device.

It should be understood that the apparatus 600 in this embodiment of the present disclosure may correspond to the network device in the method embodiment of the present disclosure, and the foregoing and other operations and/or functions of the modules in the apparatus 600 are separately used to implement corresponding procedures of the method 300 shown in FIG. 6. For brevity, descriptions of the method embodiment may be applicable to the apparatus embodiment, and details are not described herein again.

Therefore, in the pilot sequence transmission apparatus in this embodiment of the present disclosure, a network device detects, on a first OFDM symbol of a grant free transmission resource, a first pilot sequence sent by a terminal device, to determine, according to the first pilot sequence, whether the terminal device is in an active state; detects, on a second OFDM symbol of the grant free transmission resource, only a second pilot sequence corresponding to the detected first pilot sequence, that is, detects only the second pilot sequence of the terminal device that is in an active state; and demodulates uplink data according to the second pilot sequence. Therefore, the network device does not need to detect all possible second pilot sequences, so that a quantity of detected pilots can be significantly reduced, and pilot detection complexity is reduced.

In another aspect, in the pilot sequence transmission apparatus in this embodiment of the present disclosure, the second pilot sequence is set to a sub-sequence combination including multiple sub-sequences. For a same quantity of second OFDM symbols, a quantity of second pilot sequences supported by the second OFDM symbols can be significantly increased. Therefore, a pilot collision probability can be significantly reduced, correctness of uplink data demodulation is increased, and a case in which excessive second OFDM symbols are occupied can be avoided, so that pilot overheads can be significantly reduced, and more time-frequency resources can be used for data transmission, that is, a data transmission amount of a system can be significantly increased.

Figure 10:
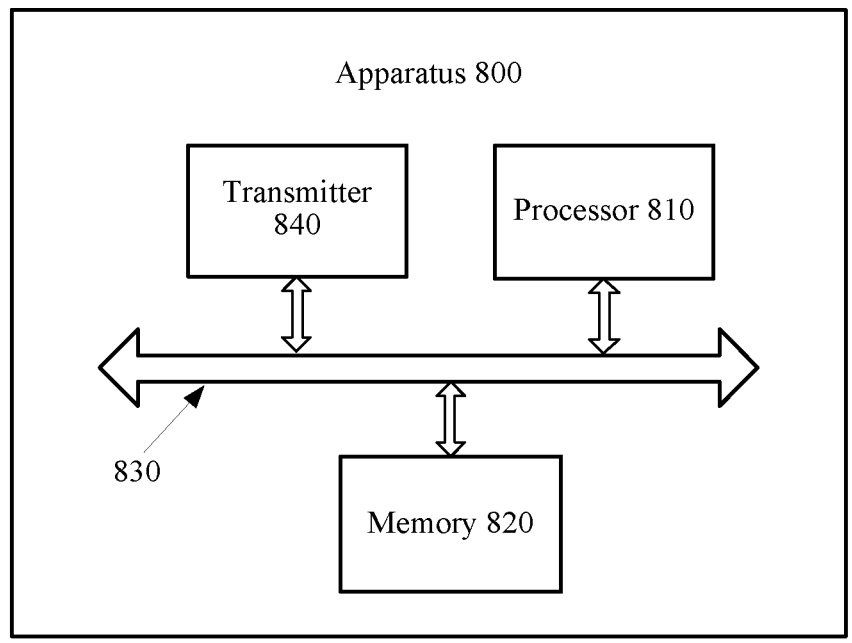
FIG. 10 is a schematic block diagram of a pilot sequence transmission apparatus according to still another embodiment of the present disclosure.

As shown in FIG. 10, an embodiment of the present disclosure further provides a pilot sequence transmission apparatus 800. The apparatus 800 includes a processor 810 and a transmitter 840. The processor 810 is connected to the transmitter 840. Optionally, the apparatus 800 further includes a memory 820. The memory 820 is separately connected to the processor 810 and the transmitter 840. Further optionally, the apparatus 800 includes a bus system 830. The processor 810, the memory 820, and the transmitter 840 may be connected by using the bus system 830. The memory 820 may be configured to store an instruction. The processor 810 is configured to execute the instruction stored in the memory 820, to control the transmitter 840 to send a signal. The processor 810 is configured to:

determine a first pilot sequence used to indicate whether a terminal device is in an active state;

determine a second pilot sequence used for uplink data demodulation;

map the first pilot sequence to a first orthogonal frequency division multiplexing OFDM symbol of a grant free transmission resource; and map the second pilot sequence to a second OFDM symbol of the grant free transmission resource.

The transmitter 840 is configured to:

send the first pilot sequence and the second pilot sequence by using the first OFDM symbol and the second OFDM symbol.

Therefore, in the pilot sequence transmission apparatus in this embodiment of the present disclosure, a terminal device determines a first pilot sequence used to indicate whether the terminal device is in an active state and determines a second pilot sequence used for uplink data demodulation, respectively maps the first pilot sequence and the second pilot sequence to a first OFDM symbol and a second OFDM symbol of a grant free transmission resource, and sends the first pilot sequence and the second pilot sequence by using the first OFDM symbol and the second OFDM symbol. Therefore, a network device can determine activeness of the terminal device by detecting the first pilot sequence, and can detect only a second pilot sequence of a terminal device that is in an active state, and does not need to detect all possible second pilot sequences, so that a quantity of detected pilots can be significantly reduced, and pilot detection complexity is reduced.

It should be understood that, in this embodiment of the present disclosure, the processor 810 may be a central processing unit (CPU), or the processor 810 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor or the processor may be any conventional processor or the like.

The memory 820 may include a read-only memory and a random access memory, and provides an instruction and data to the processor 810. A part of the memory 820 may further include a non-volatile random access memory. For example, the memory 820 may further store device type information.

The bus system 830 may further include a power bus, a control bus, a status signal bus, and the like in addition to a data bus. However, for clear description, various types of buses in the figure are marked as the bus system 830.

In an implementation process, the steps of the foregoing method may be completed by using an integrated logic circuit of hardware in the processor 810 or an instruction in a form of software. Steps of the method disclosed with reference to the embodiments of the present disclosure may be directly performed and completed by a hardware processor, or may be performed and completed by a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 820, and the processor 810 reads information in the memory 820 and completes the steps of the foregoing method in combination with hardware of the processor 810. To avoid repetition, details are not described herein again.

Optionally, in an embodiment, the processor 810 is further configured to determine a first pilot number.

That the processor 810 determines a first pilot sequence used to indicate whether a terminal device is in an active state includes:

determining the first pilot sequence according to the first pilot number.

The determining a second pilot sequence used for uplink data demodulation includes:

determining the second pilot sequence according to the first pilot number.

Optionally, in an embodiment, that the processor 810 determines a first pilot number includes:

determining the first pilot number according to an identifier of the terminal device; or determining the first pilot number according to an identifier of the grant free transmission resource and an identifier of the terminal device; or generating the first pilot number by using a random number generator.

Optionally, in an embodiment, that the processor 810 maps the first pilot sequence to a first orthogonal frequency division multiplexing OFDM symbol of a grant free transmission resource includes:

mapping the first pilot sequence to a part of a subband of the first OFDM symbol of the grant free transmission resource.

Optionally, in an embodiment, an element of the first pilot sequence is a non-zero element.

Optionally, in an embodiment, the first pilot sequence includes a first pilot sub-sequence and a second pilot sub-sequence. Each element of the first pilot sub-sequence is a zero element, and an element of the second pilot sub-sequence is a non-zero element.

Optionally, in an embodiment, that the processor 810 maps the first pilot sequence to a first orthogonal frequency division multiplexing OFDM symbol of a grant free transmission resource includes:

mapping the non-zero element included in the first pilot sequence to a first subband of the first OFDM symbol of the grant free transmission resource, where the first subband includes M resource elements REs, a non-zero symbol formed after the non-zero element is mapped is an M-order Walsh code, and M is a positive integer and is an exponential power of 2.

Optionally, in an embodiment, the REs included in the first subband are M consecutive REs.

Optionally, in an embodiment, that the processor 810 maps the first pilot sequence to a first orthogonal frequency division multiplexing OFDM symbol of a grant free transmission resource includes:

repeatedly mapping the first pilot sequence to different first OFDM symbols of the grant free transmission resource; and/or repeatedly mapping the first pilot sequence to different subbands of the first OFDM symbol of the grant free transmission resource.

Optionally, in an embodiment, the first pilot sequence is in one-to-one correspondence with the second pilot sequence.

Optionally, in an embodiment, the second pilot sequence is a sub-sequence combination including multiple sub-sequences.

Optionally, in an embodiment, that the processor 810 maps the second pilot sequence to a second OFDM symbol of the grant free transmission resource includes:

mapping at least two of the multiple sub-sequences included in the second pilot sequence to a same second OFDM symbol of the grant free transmission resource.

Optionally, in an embodiment, that the processor 810 maps the second pilot sequence to a second OFDM symbol of the grant free transmission resource includes:

mapping all the multiple sub-sequences included in the second pilot sequence to a same second OFDM symbol of the grant free transmission resource.

Optionally, in an embodiment, that the processor 810 maps the second pilot sequence to a second OFDM symbol of the grant free transmission resource includes:

separately mapping at least two of the multiple sub-sequences included in the second pilot sequence to different subbands of a same second OFDM symbol of the grant free transmission resource.

Optionally, in an embodiment, that the processor 810 maps the second pilot sequence to a second OFDM symbol of the grant free transmission resource includes:

separately mapping all the multiple sub-sequences included in the second pilot sequence to different second OFDM symbols of the grant free transmission resource.

Optionally, in an embodiment, that the processor 810 maps the second pilot sequence to a second OFDM symbol of the grant free transmission resource includes:

separately mapping all the multiple sub-sequences included in the second pilot sequence to entire frequency bands of the different second OFDM symbols of the grant free transmission resource, where the second OFDM symbols are different from the first OFDM symbol.

Optionally, in an embodiment, the second pilot sequence is generated by using multiple cyclic shift values, and the multiple cyclic shift values are in one-to-one correspondence with the multiple sub-sequences.

Optionally, in an embodiment, that the processor 810 maps the second pilot sequence to a second OFDM symbol of the grant free transmission resource includes:

repeatedly mapping the second pilot sequence to different second OFDM symbols of the grant free transmission resource.

Optionally, in an embodiment, the the processor 810 is specifically configured to select the first pilot sequence from a first pilot sequence set.

Optionally, in an embodiment, the the processor 810 is specifically configured to select the second pilot sequence from a second pilot sequence set.

Optionally, in an embodiment, the grant free transmission resource is a transmission resource combining time and frequency, or a transmission resource combining time, frequency, and code domains.

Optionally, in an embodiment, the apparatus is applied to device-to-device D2D communication, machine to machine M2M communication, or machine type communication.

Optionally, in an embodiment, the network device is a base station, and the terminal device is user equipment.

It should be understood that the pilot sequence transmission apparatus 800 in this embodiment of the present disclosure may correspond to the terminal device and the apparatus 500 in the embodiments of the present disclosure, and may correspond to an execution body of the method in the embodiments of the present disclosure. In addition, the foregoing and other operations and/or functions of the modules in the apparatus 800 are used to implement corresponding procedures of the method in FIG. 1 to FIG. 5F. For brevity, descriptions of the method embodiment may be applicable to the apparatus embodiment, and details are not described herein again.

Therefore, in the pilot sequence transmission apparatus in this embodiment of the present disclosure, a terminal device determines a first pilot sequence used to indicate whether the terminal device is in an active state and determines a second pilot sequence used for uplink data demodulation, respectively maps the first pilot sequence and the second pilot sequence to a first OFDM symbol and a second OFDM symbol of a grant free transmission resource, and sends the first pilot sequence and the second pilot sequence by using the first OFDM symbol and the second OFDM symbol. Therefore, a network device can determine activeness of the terminal device by detecting the first pilot sequence, and can detect only a second pilot sequence of a terminal device that is in an active state, and does not need to detect all possible second pilot sequences, so that a quantity of detected pilots can be significantly reduced, and pilot detection complexity is reduced.

In another aspect, in the pilot sequence transmission apparatus in this embodiment of the present disclosure, the second pilot sequence is set to a sub-sequence combination including multiple sub-sequences. For a same quantity of second OFDM symbols, a quantity of second pilot sequences supported by the second OFDM symbols can be significantly increased. Therefore, a pilot collision probability can be significantly reduced, correctness of uplink data demodulation is increased, and a case in which excessive second OFDM symbols are occupied can be avoided, so that pilot overheads can be significantly reduced, and more time-frequency resources can be used for data transmission, that is, a data transmission amount of a system can be significantly increased.

Figure 11:
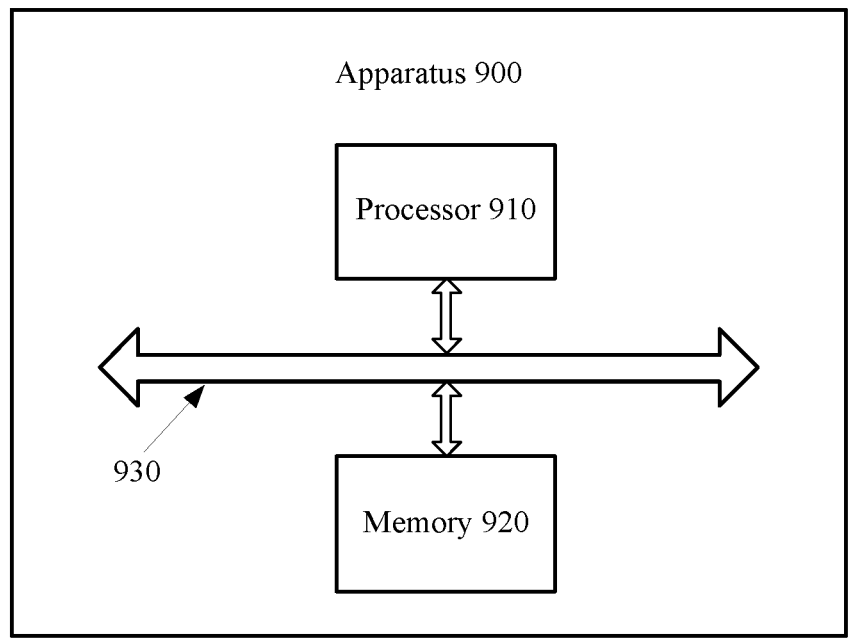
FIG. 11 is a schematic block diagram of a pilot sequence transmission apparatus according to still another embodiment of the present disclosure.

As shown in FIG. 11, an embodiment of the present disclosure further provides a pilot sequence transmission apparatus 900. The apparatus 900 includes a processor 910. Optionally, the apparatus 900 includes a memory 920. The processor 910 is connected to the memory 920. Further optionally, the apparatus 900 includes a bus system 930. The processor 910 and the memory 920 may be connected by using the bus system 930, the memory 920 is configured to store an instruction, and the processor 910 is configured to execute the instruction stored in the memory 920. The processor 910 is configured to:

detect, on a first orthogonal frequency division multiplexing OFDM symbol of a grant free transmission resource, a first pilot sequence sent by a terminal device, where the first pilot sequence is used to indicate whether the terminal device is in an active state;

detect, on a second OFDM symbol of the grant free transmission resource, a second pilot sequence that is sent by the terminal device and that corresponds to the first pilot sequence, where the second pilot sequence is used for uplink data demodulation; and demodulate uplink data according to the second pilot sequence.

Therefore, in the pilot sequence transmission apparatus in this embodiment of the present disclosure, a network device detects, on a first OFDM symbol of a grant free transmission resource, a first pilot sequence sent by a terminal device, to determine, according to the first pilot sequence, whether the terminal device is in an active state; detects, on a second OFDM symbol of the grant free transmission resource, only a second pilot sequence corresponding to the detected first pilot sequence, that is, detects only the second pilot sequence of the terminal device that is in an active state; and demodulates uplink data according to the second pilot sequence. Therefore, the network device does not need to detect all possible second pilot sequences, so that a quantity of detected pilots can be significantly reduced, and pilot detection complexity is reduced.

It should be understood that, in this embodiment of the present disclosure, the processor 910 may be a central processing unit (CPU), or the processor 910 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor or the processor may be any conventional processor or the like.

The memory 920 may include a read-only memory and a random access memory, and provides an instruction and data to the processor 910. A part of the memory 920 may further include a non-volatile random access memory. For example, the memory 920 may further store device type information.

The bus system 930 may further include a power bus, a control bus, a status signal bus, and the like in addition to a data bus. However, for clear description, various types of buses in the figure are marked as the bus system 930.

In an implementation process, the steps of the foregoing method may be completed by using an integrated logic circuit of hardware in the processor 910 or an instruction in a form of software. Steps of the method disclosed with reference to the embodiments of the present disclosure may be directly performed and completed by a hardware processor, or may be performed and completed by a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 920, and the processor 910 reads information in the memory 920 and completes the steps of the foregoing method in combination with hardware of the processor 910. To avoid repetition, details are not described herein again.

Optionally, in an embodiment, that the processor 910 detects, on a first orthogonal frequency division multiplexing OFDM symbol of a grant free transmission resource, a first pilot sequence sent by a terminal device includes:

detecting the first pilot sequence in a part of a subband of the first OFDM symbol of the grant free transmission resource.

Optionally, in an embodiment, an element of the first pilot sequence is a non-zero element.

Optionally, in an embodiment, the first pilot sequence includes a first pilot sub-sequence and a second pilot sub-sequence. Each element of the first pilot sub-sequence is a zero element, and an element of the second pilot sub-sequence is a non-zero element.

Optionally, in an embodiment, that the processor 910 detects, on a first orthogonal frequency division multiplexing OFDM symbol of a grant free transmission resource, a first pilot sequence sent by a terminal device includes:

detecting the first pilot sequence in a first subband of the first OFDM symbol of the grant free transmission resource, where the first subband includes M resource elements REs, a non-zero symbol formed after the non-zero element is mapped is an M-order Walsh code, and M is a positive integer and is an exponential power of 2.

Optionally, in an embodiment, the REs included in the first subband are M consecutive REs.

Optionally, in an embodiment, the first pilot sequence is in one-to-one correspondence with the second pilot sequence.

Optionally, in an embodiment, the second pilot sequence is a sub-sequence combination including multiple sub-sequences.

Optionally, in an embodiment, at least two of the multiple sub-sequences included in the second pilot sequence are sub-sequences mapped to a same second OFDM symbol of the grant free transmission resource.

Optionally, in an embodiment, all the multiple sub-sequences included in the second pilot sequence are sub-sequences mapped to a same second OFDM symbol of the grant free transmission resource.

Optionally, in an embodiment, at least two of the multiple sub-sequences included in the second pilot sequence are sub-sequences separately mapped to different subbands of a same second OFDM symbol of the grant free transmission resource.

Optionally, in an embodiment, all the multiple sub-sequences included in the second pilot sequence are sub-sequences separately mapped to different second OFDM symbols of the grant free transmission resource.

Optionally, in an embodiment, all the multiple sub-sequences included in the second pilot sequence are sub-sequences separately mapped to entire frequency bands of the different second OFDM symbols of the grant free transmission resource. The second OFDM symbols are different from the first OFDM symbol.

Optionally, in an embodiment, the second pilot sequence is represented by using multiple cyclic shift values. The multiple cyclic shift values are in one-to-one correspondence with the multiple sub-sequences.

Optionally, in an embodiment, the grant free transmission resource is a transmission resource combining time and frequency, or a transmission resource combining time, frequency, and code domains.

Optionally, in an embodiment, the apparatus is applied to device-to-device D2D communication, machine to machine M2M communication, or machine type communication.

Optionally, in an embodiment, the network device is a base station, and the terminal device is user equipment.

Therefore, in an embodiment, that the processor 910 detects, on a first orthogonal frequency division multiplexing OFDM symbol of a grant free transmission resource, a first pilot sequence sent by a terminal device includes:

detecting, on different first OFDM symbols of the grant free transmission resource, the first pilot sequence repeatedly mapped by the terminal device; and/or detecting, in different subbands of the first OFDM symbol of the grant free transmission resource, the first pilot sequence repeatedly mapped by the terminal device.

Optionally, in an embodiment, that the processor 910 detects, on a second OFDM symbol of the grant free transmission resource, a second pilot sequence that is sent by the terminal device and that corresponds to the first pilot sequence includes: detecting, on different second OFDM symbols of the grant free transmission resource, the second pilot sequence repeatedly mapped by the terminal device; and/or detecting, in different subbands of the second OFDM symbol of the grant free transmission resource, the second pilot sequence repeatedly mapped by the terminal device.

It should be understood that the pilot sequence transmission apparatus 900 in this embodiment of the present disclosure may correspond to the terminal device and the apparatus 600 in the embodiments of the present disclosure, and may correspond to an execution body of the method in the embodiments of the present disclosure. In addition, the foregoing and other operations and/or functions of the modules in the apparatus 900 are used to implement corresponding procedures of the method in FIG. 6. For brevity, details are not described herein again.

Therefore, in the pilot sequence transmission apparatus in this embodiment of the present disclosure, a network device detects, on a first OFDM symbol of a grant free transmission resource, a first pilot sequence sent by a terminal device, to determine, according to the first pilot sequence, whether the terminal device is in an active state; detects, on a second OFDM symbol of the grant free transmission resource, only a second pilot sequence corresponding to the detected first pilot sequence, that is, detects only the second pilot sequence of the terminal device that is in an active state; and demodulates uplink data according to the second pilot sequence. Therefore, the network device does not need to detect all possible second pilot sequences, so that a quantity of detected pilots can be significantly reduced, and pilot detection complexity is reduced.

In another aspect, in the pilot sequence transmission apparatus in this embodiment of the present disclosure, the second pilot sequence is set to a sub-sequence combination including multiple sub-sequences. For a same quantity of second OFDM symbols, a quantity of second pilot sequences supported by the second OFDM symbols can be significantly increased. Therefore, a pilot collision probability can be significantly reduced, correctness of uplink data demodulation is increased, and a case in which excessive second OFDM symbols are occupied can be avoided, so that pilot overheads can be significantly reduced, and more time-frequency resources can be used for data transmission, that is, a data transmission amount of a system can be significantly increased.

It should be understood that the sending module or the sending unit or the transmitter in the foregoing embodiments of the present disclosure may perform sending over an air interface, or may not perform sending over an air interface but performs sending to another device, so that the another device performs sending over an air interface. Similarly, the receiving module or the receiving unit or the receiver in the foregoing embodiments may perform receiving over an air interface, or may not perform receiving over an air interface but another device performs receiving over an air interface.

It may be understood that, for the brevity and clarity of the application document, technical features and description of an embodiment above may be applicable to other embodiments. For example, technical features of a method embodiment may be applicable to an apparatus embodiment or another method embodiment, and are not described one by one in detail in the other embodiments.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in the embodiments of the present disclosure, "B corresponding to A" indicates that B is associated with A, and B may be determined according to A. However, it should further be understood that determining B according to A does not mean that B is determined according to A only; that is, B may also be determined according to A and/or other information.

A person of ordinary skill in the art may be aware that, the units and steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for pilot sequence transmission, the method comprising:
   determining, by a terminal device, a first pilot sequence from a first pilot sequence set;
   mapping, by the terminal device, the first pilot sequence to a first orthogonal frequency division multiplexing (OFDM) symbol of a grant free transmission resource;
   determining, by the terminal device, a second pilot sequence for uplink data demodulation;
   mapping, by the terminal device, the second pilot sequence to either:
   (1) a second OFDM symbol of the grant fee transmission resource and a third OFDM symbol of the grant fee transmission resource, wherein a first pilot sub-sequence comprised in the second pilot sequence is mapped to the second OFDM symbol of the grant fee transmission resource, and a second pilot sub-sequence comprised in the second pilot sequence is mapped to the third OFDM symbol of the grant fee transmission resource; or (2) a fourth OFDM symbol of the grant fee transmission resource; and sending, by the terminal device, the first pilot sequence and the second pilot sequence.

2. The method according to claim 1, further comprising:

determining a first pilot number, wherein the first pilot sequence is determined according to the first pilot number, and wherein the second pilot sequence is determined according to the first pilot number.

3. The method according to claim 2, wherein the first pilot number is determined according to:

an identifier of the terminal device, or an identifier of the grant free transmission resource and the identifier of the terminal device, or a random number generator.

4. The method according to claim 1, wherein the first pilot sequence is mapped to a part of a subband of the first OFDM symbol of the grant free transmission resource.

5. The method according to claim 4, wherein the first pilot sequence includes a non-zero element.

6. The method according to claim 4, wherein the first pilot sequence comprises a third pilot sub-sequence and a fourth pilot sub-sequence, wherein each element of the third pilot sub-sequence is a zero element, and wherein the fourth pilot sub-sequence includes a non-zero element.

7. The method according to claim 1, further comprising:

repeatedly mapping the first pilot sequence to different OFDM symbols of the grant free transmission resource or different subbands of the first OFDM symbol of the grant free transmission resource.

8. The method according to claim 1, wherein the first pilot sequence is in one-to-one correspondence or one-to-multiple correspondence with the second pilot sequence.

9. The method according to claim 1, wherein the first pilot sequence is a Zadoff-Chu (ZC) sequence.

10. An apparatus for pilot sequence transmission, the apparatus comprising:

a memory storing instructions; and a processor configured to execute the instructions, wherein executing the instructions causes the processor to:

determine a first pilot sequence from a first pilot sequence set;

map the first pilot sequence to a first orthogonal frequency division multiplexing (OFDM) symbol of a grant free transmission resource;

determine a second pilot sequence for uplink data demodulation; and map the second pilot sequence to either:

(1) a second OFDM symbol of the grant fee transmission resource and a third OFDM symbol of the grant fee transmission resource, wherein a first pilot sub-sequence comprised in the second pilot sequence is mapped to the second OFDM symbol of the grant fee transmission resource, and a second pilot sub-sequence comprised in the second pilot sequence is mapped to the third OFDM symbol of the grant fee transmission resource; or (2) a fourth OFDM symbol of the grant fee transmission resource.

11. The apparatus according to claim 10, further comprising:

a transmitter coupled to the processor, wherein the transmitter is configured to send the first pilot sequence and the second pilot sequence based on the first OFDM symbol, the second OFDM symbol, and the third OFDM symbol.

12. The apparatus according to claim 10, wherein executing the instructions further causes the processor to:

determine a first pilot number, wherein the first pilot sequence and the second pilot sequence are determined according to the first pilot number.

13. The apparatus according to claim 12, wherein determining the first pilot number is based on:

an identifier of the apparatus, or an identifier of the grant free transmission resource and the identifier of the apparatus, or a random number generator.

14. The apparatus according to claim 10, wherein the first pilot sequence is mapped to a part of a subband of the first OFDM symbol of the grant free transmission resource.

15. The apparatus according to claim 14, wherein the first pilot sequence includes a non-zero element.

16. The apparatus according to claim 14, wherein the first pilot sequence comprises a third pilot sub-sequence and a fourth pilot sub-sequence, wherein each element of the third pilot sub-sequence is a zero element, and wherein the fourth pilot sub-sequence includes a non-zero element.

17. The apparatus according to claim 10, wherein executing the instructions further causes the processor to:

repeatedly map the first pilot sequence to different OFDM symbols of the grant free transmission resource or different subbands of the first OFDM symbol of the grant free transmission resource.

18. The apparatus according to claim 10, wherein the first pilot sequence is in one-to-one correspondence with the second pilot sequence.

19. The apparatus according to claim 10, wherein the first pilot sequence is a Zadoff-Chu (ZC) sequence.

* * * * *

UNITED STATES PATENT AND TRADEMARK OFFICE
CERTIFICATE OF CORRECTION

PATENT NO. : 10,972,240 B2
APPLICATION NO. : 16/539698
DATED : April 6, 2021
INVENTOR(S) : Wu et al.

It is certified that error appears in the above-identified patent and that said Letters Patent is hereby corrected as shown below:

In the Claims

Claim 1: Column 58, Line 59: "(1) a second OFDM symbol of the grant fee transmis-" should read -- (1) a second OFDM symbol of the grant free transmis- --.

Claim 1: Column 58, Line 61: "fee transmission resource," should read -- free transmission resource, --.

Claim 1: Column 58, Line 63: "mapped to the second OFDM symbol of the grant fee" should read -- mapped to the second OFDM symbol of the grant free --.

Claim 1: Column 58, Line 66: "mapped to the third OFDM symbol of the grant fee" should read -- mapped to the third OFDM symbol of the grant free --.

Claim 1: Column 59, Line 1: "(2) a fourth OFDM symbol of the grant fee transmis-" should read -- (2) a fourth OFDM symbol of the grant free transmis- --.

Claim 10: Column 59, Line 50: "(1) a second OFDM symbol of the grant fee trans-" should read -- (1) a second OFDM symbol of the grant free trans- --.

Claim 10: Column 59, Line 52: "grant fee transmission resource," should read -- grant free transmission resource, --.

Claim 10: Column 60, Line 3: "of the grant fee transmission resource," should read -- of the grant free transmission resource, --.

Claim 10: Column 60, Line 6: "symbol of the grant fee transmission resource;" should read -- symbol of the grant free transmission resource; --.

Signed and Sealed this
Third Day of May, 2022

Katherine Kelly Vidal
*Director of the United States Patent and Trademark Office*

Claim 10: Column 60, Line 7: "(2) a fourth OFDM symbol of the grant fee trans-" should read -- (2) a fourth OFDM symbol of the grant free trans- --.